US006175400B1

(12) United States Patent
Duncan et al.

(10) Patent No.: US 6,175,400 B1
(45) Date of Patent: Jan. 16, 2001

(54) BROADBAND CHOLESTERIC OPTICAL DEVICE HAVING A BROADBAND CHOLESTERIC LAYER, A POSITIVE C-PLATE AND A NEGATIVE C-PLATE

(75) Inventors: Anderson James Duncan, Abingdon; Robert George Brown, Thame; Gillian Margaret Davis, Huntingdon; Kathryn Walsh, Mansfield, all of (GB)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/012,469

(22) Filed: Jan. 22, 1998

(30) Foreign Application Priority Data

Jan. 24, 1997 (GB) ................................................ 9701472

(51) Int. Cl.⁷ ................................................ G02F 1/1335

(52) U.S. Cl. .............................. 349/117; 349/96; 349/98; 349/120

(58) Field of Search ................................. 349/96, 98, 117, 349/120

(56) References Cited

U.S. PATENT DOCUMENTS

| 5,061,042 | * | 10/1991 | Nakamura et al. | ................. | 359/63 |
| 5,093,739 | * | 3/1992 | Aida et al. | ........................ | 349/120 |

(List continued on next page.)

FOREIGN PATENT DOCUMENTS

| 0524028 | 1/1993 | (EP) . |
| 0531120 | 3/1993 | (EP) . |
| 0606939 | 7/1994 | (EP) . |
| 0606940 | 7/1994 | (EP) . |
| 0634674 | 1/1995 | (EP) . |
| 0720041 | 7/1996 | (EP) . |
| 9602016 | 1/1996 | (WO) . |
| 9610774 | 4/1996 | (WO) . |

OTHER PUBLICATIONS

Search Report for Application No. GB 9701472.4; Dated Apr. 17, 1997.

V. A. Belyakov et al., Sov. Phys. Usp., vol. 22, No. 2, pp. 63–88, 1979, "Optics of Cholesteric Liquid Crystals".

G. Joly et al., J. Optics, vol. 25, No. 5, pp. 177–186, 1994, "Optical Properties of the Interface Between a Twisted Liquid Crystal and an Isotropic Transparent Medium".

L. E. Hajdo et al., J. Opt. Soc. Am., vol. 69, No. 7, pp. 1017–1023, 1979, "Theory of Light Reflection by Cholesteric Liquid Crystals Possessing a Pitch Gradient".

H. L. Ong, Japan Display '92, pp. 247–250, 1992, "New Normally White Negative Birefringence Film Compensated Twisted Nematic LCDs With Largest Viewing Angle Performance".

S. -T. Wu, SID 95 Digest, pp. 555–558, 1995, "Phase-Matched Biaxial Compensation Film for LCDs".

S. Nishimura et al., SID 95 Digest pp. 567–570, 1995, "The Performance of a Liquid–Crystal Polymer Film as an Optical Compensator for a Fast–Response STN–LCD".

(List continued on next page.)

* cited by examiner

Primary Examiner—William L. Sikes
Assistant Examiner—Tarifur R. Chowdhury
(74) Attorney, Agent, or Firm—Renner, Otto, Boiselle & Sklar LLP

(57) ABSTRACT

A broadband cholesteric optical device such as a polarizer or a spectral filter includes a broadband cholesteric layer, for instance, of a graded pitch type such that the cholesteric pitch increases monotonically from one surface of the film to the other surface. In order to improve the off-axis performance, a compensator is provided in the form of a positive birefringence film whose optic axis is substantially perpendicular to the film. Another negative birefringence film whose optic axis is also perpendicular to the film may also be provided.

35 Claims, 29 Drawing Sheets

U.S. PATENT DOCUMENTS

| | | | | |
|---|---|---|---|---|
| 5,138,474 | * | 8/1992 | Arakawa | 359/73 |
| 5,189,538 | * | 2/1993 | Arakawa | 359/73 |
| 5,196,953 | * | 3/1993 | Yeh et al. | 359/73 |
| 5,430,565 | * | 7/1995 | Yamanouchi et al. | 359/73 |
| 5,504,603 | * | 4/1996 | Winker et al. | 359/73 |
| 5,506,704 | * | 4/1996 | Broer et al. | 359/63 |
| 5,518,785 | | 5/1996 | Kawata et al. | 428/1 |
| 5,594,568 | * | 1/1997 | Abileah et al. | 349/120 |
| 5,619,352 | * | 4/1997 | Koch et al. | 349/117 |
| 5,657,140 | * | 8/1997 | Xu et al. | 349/120 |
| 5,730,903 | * | 3/1998 | Okazaki | 349/117 |
| 5,731,886 | * | 3/1998 | Taber et al. | 359/65 |
| 5,737,044 | * | 4/1998 | Van Haaren et al. | 349/117 |
| 5,747,121 | * | 5/1998 | Okazaki et al. | 428/1 |
| 5,793,456 | * | 8/1998 | Broer et al. | 349/98 |
| 5,798,057 | * | 8/1998 | Hikmet | 252/299.5 |
| 5,818,559 | * | 10/1998 | Yoshida | 349/122 |
| 5,825,444 | * | 10/1998 | Broer et al. | 349/98 |
| 5,986,733 | * | 11/1999 | Winker et al. | 349/120 |
| 5,986,734 | * | 11/1999 | Winker et al. | 349/123 |
| 6,061,108 | * | 5/2000 | Anderson et al. | 349/98 |

OTHER PUBLICATIONS

J. –C. Yoo et al., Conference Record of the 1994 International Display Research Conference and International Display Research Conference and International Workshops on Active–Matrix LCDs & Display Materials, pp. 217–219, 1994, "Novel Compensator with Grating Structure for Twisted Nematic . . . ".

$$n(av) \sim \frac{n(e) + n(o)}{2}$$

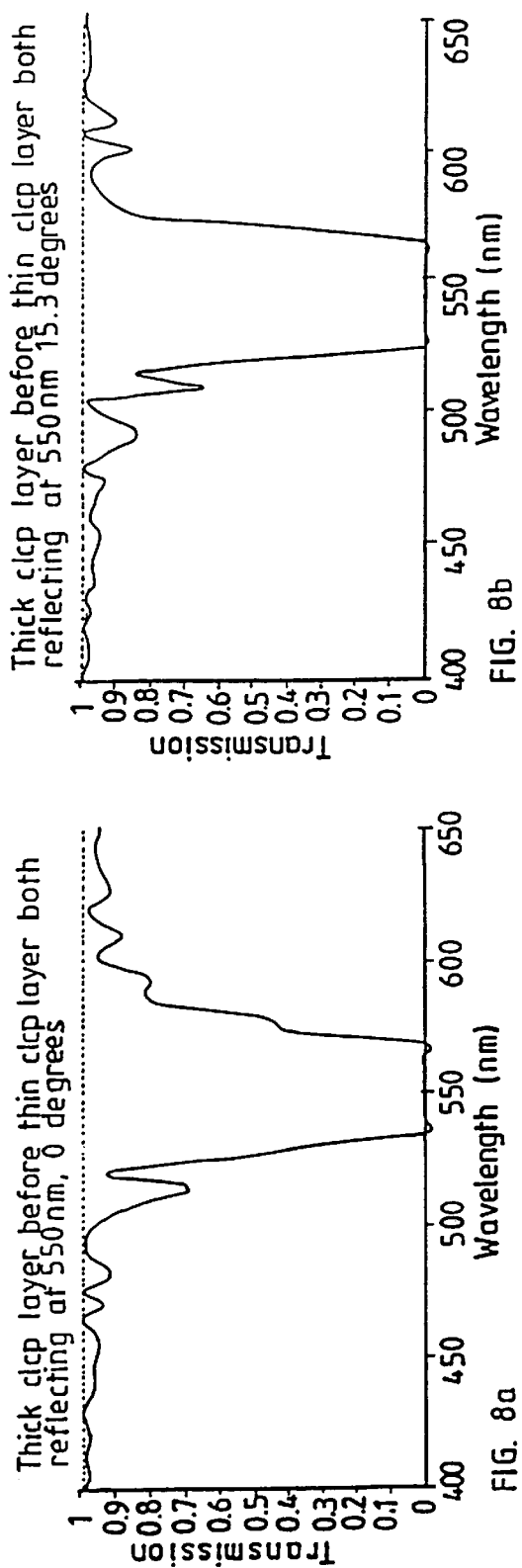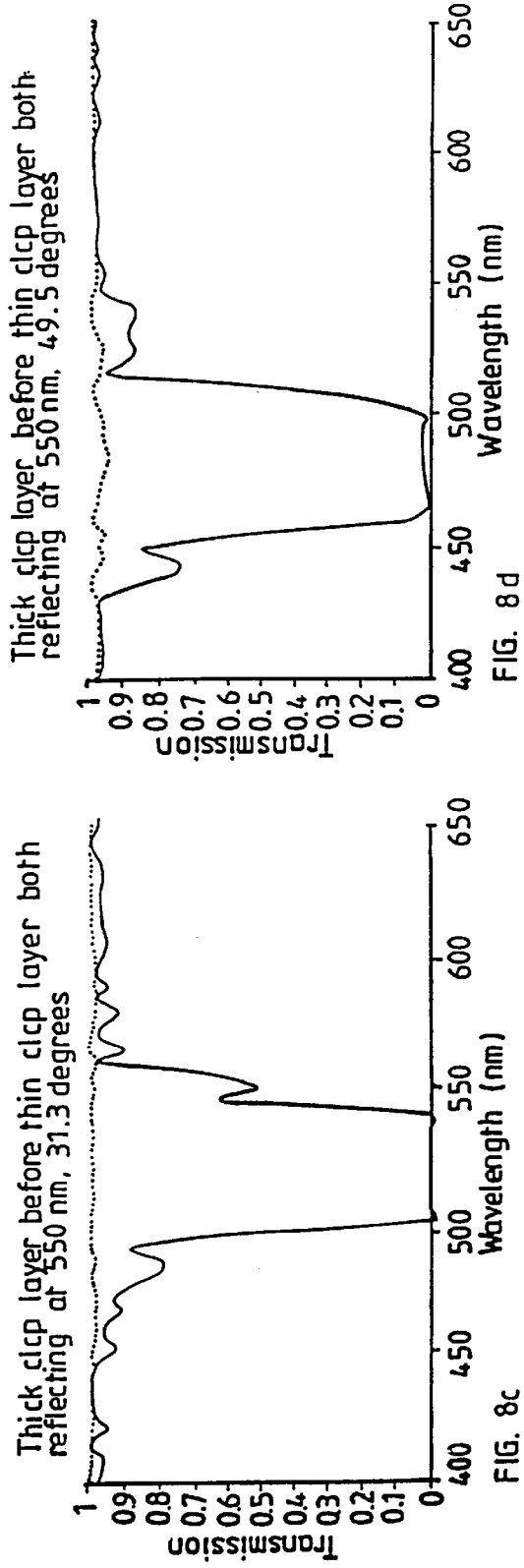

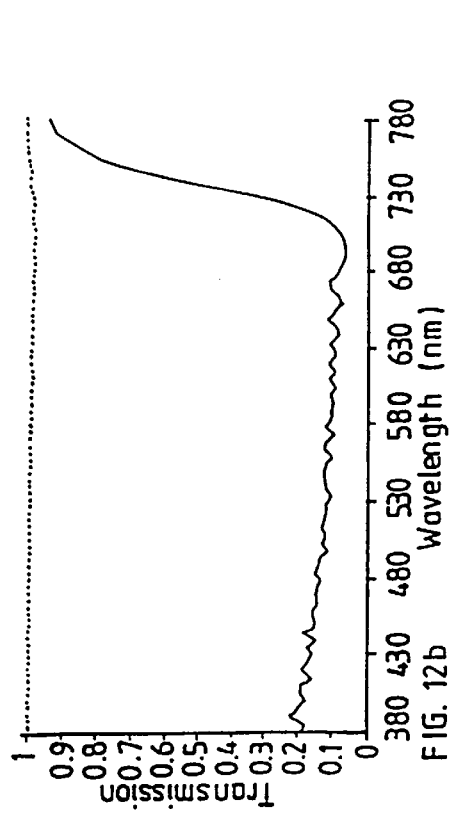
FIG. 12a — Short pitch to long pitch, no compensator, 0 degrees
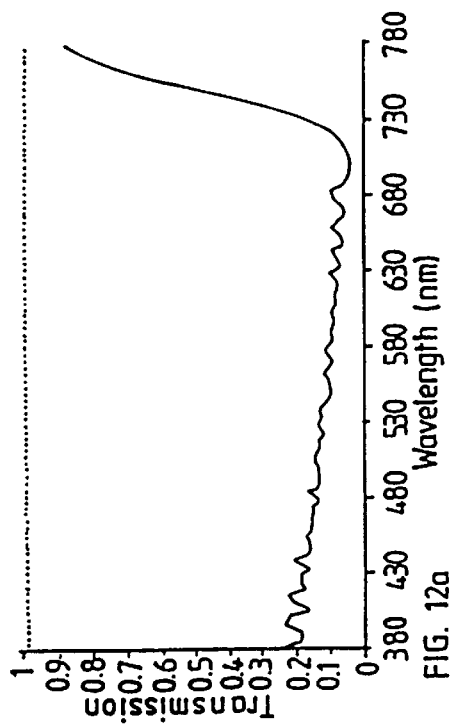
FIG. 12c — Short pitch to long pitch, no compensator, 31 degrees
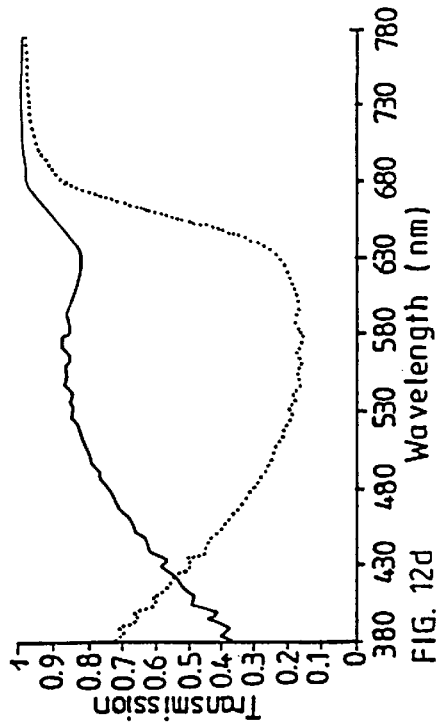
FIG. 12b — Short pitch to long pitch, no compensator, 15 degrees
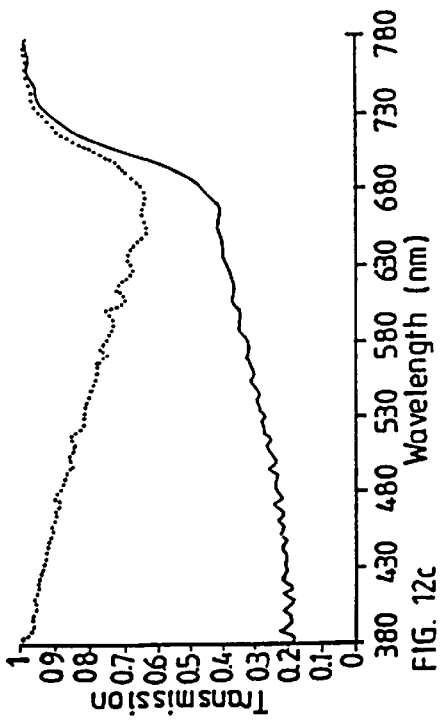
FIG. 12d — Short pitch to long pitch, no compensator, 49 degrees

BROADBAND CHOLESTERIC OPTICAL DEVICE HAVING A BROADBAND CHOLESTERIC LAYER, A POSITIVE C-PLATE AND A NEGATIVE C-PLATE

TECHNICAL FIELD OF THE INVENTION

The present invention relates to a broadband cholesteric optical device, for instance for use in polarisers, filters, liquid crystal devices and polarising beam-splitters. Such devices may be used in displays such as liquid crystal displays and as colour or notch filters. Such devices may also be used in head mounted displays, optical and electronic measuring and sensing systems, compensators and for high flux applications.

DISCUSSION OF THE RELATED ART

As is well known in the art, a cholesteric liquid crystal is one in which the director rotates through the material, forming a helical structure. The term "cholesteric" is synonymous with "chiral nematic".

EP 0 720 041 discloses patterned cholesteric colour filters and polarisers which comprise several layers which are active in different defined spectral bands.

EP 0 634 674 discloses a wide spectral and angular bandwidth rear. polariser for direct view displays. The broadband polariser is made using high birefringence cholesteric materials or by using stacks of lower birefringence cholesteric films.

EP 0 606 940 discloses a broadband cholesteric polariser which is made using a combination of ultraviolet (UV) intensity profile and diffusion to expand the polariser bandwidth. The intensity profile results from using a polymerising wavelength in a range where the maximum of the sum of the absorptions of the cholesteric material and the photoinitiator exists. Alternatively, an appropriate UV absorbing dye is added to the cholesteric mixture. The polariser comprises a graded pitch structure which varies monotonically from one surface of the polariser to the other.

Although not shown, similar off-axis birefringence effects occur if a thick cholesteric layer is provided after each reflecting layer.

"Optics of cholesteric liquid crystals", V. A. Belyakov et al, Sov. Phys. Usp. 22(2), pp 63–88, Febrary 1979 and "Optical properties of the interface between a twisted liquid crystal and an isotropic transparent medium" G. Joly et al, J Optics, vol 25 pp 177–186 (1994) disclose that, for a single pitch cholesteric film, the polarisation state of reflected and transmitted light has a complex dependence on wavelength and angle of illumination. For graded pitch cholesteric films providing wider reflection bandwidths, the angular dependence is more complex but has not been studied. "Theory of light reflection by cholesteric liquid crystals possessing a pitch gradient" L. E. Hajdo et al, J.Opt. Soc. Am. vol 69, No.7, July 1979 considers only normal incidence.

WO96/02016 discloses a backlight illumination system for a liquid crystal device (LCD) comprising a broadband cholesteric polariser. This patent discloses that improved off-axis performance may be achieved by orienting the cholesteric liquid crystal polymer (CLCP) polariser such that the largest pitch is closest to the illumination source. Also, a negative birefringence quarter wavefilm may be used to provide a further improvement to the off-axis performance as well as to convert light to a linearly polarised state.

It is known to use compensators in LCDs in order to reduce or eliminate the unwanted effects of birefringence. Various types of compensators for dealing with specified birefringence problems have been disclosed. For instance, a negative birefringence film whose optic axis is normal to the film plane is disclosed in Japan Display '92 247–250 for improving the viewing angle of a normally white mode twisted nematic LCD. Also, angular compensation for a normally white mode twisted nematic or super twisted nematic LCD using a short pitch cholesteric liquid crystal polymer film such that the intra-plane refractive index is substantially averaged and larger than the refractive index in the thickness direction is disclosed in EP 0 531 120. The compensation film essentially has a negative uniaxial structure whose optic axis is normal to the plane of the film. Multilayer films and holographically formed grating structures have also been used as negative birefringence compensators for normally white mode twisted nematic LCDs. SID '95, P47, 555–558, S. T. Wu discloses the use of biaxial compensators to improve the contrast ratio both on-axis and off-axis.

SID '95, P50 Nishimura "Colour compensation" discloses the use of a liquid crystal polymer film with a super twisted nematic structure and controllable retardation, twist angle and dispersion for improving the contrast ratio of super twisted nematic LCDs over the visible spectrum at normal incidence.

SUMMARY OF THE INVENTION

According to a first aspect of the invention, there is provided a broadband cholesteric optical device comprising a broadband cholesteric layer, characterised by a first compensator for providing a desired off-axis device performance, the first compensator comprising a first layer having positive birefringence and an optic axis substantially perpendicular to the first layer.

The first compensator may comprise a second layer having negative birefringence and an optic axis substantially perpendicular to the second layer.

The desired off-axis device performance may be reduced angular dependence.

The cholesteric layer may have a graded pitch which increases monotonically from a first surface to a second surface thereof.

The cholesteric layer may have a graded refractive index which increases monotonically from a first surface to a second surface thereof.

The sum of the off-axis birefringence of the first and second layers may be substantially equal to zero for a wavelength corresponding to the shortest pitch of the cholesteric layer and substantially equal to but opposite that of the cholesteric layer for a wavelength corresponding to the longest pitch of the cholesteric layer, and the first compensator may be disposed adjacent the first surface of the cholesteric layer.

The refractive index dispersions of the first and second layers may be such that:

$$|\Delta n_1(400)/\Delta n_1(700) - \Delta n_2(400)/\Delta n_2(700)| > 0$$

where $\Delta n_1(400)$ and $\Delta n_1(700)$ are the birefringence5 of the first layer at wavelengths of 400 and 700 nanometres respectively, and $\Delta n_2(400)$ and $\Delta n_2(700)$ are the birefringences of the second layer at wavelengths of 400 and 700 nanometres, respectively; i.e. $\Delta n$ is the magnitude of the difference between the refractive indices in the plane and perpendicular to the plane.

The sum of the off-axis birefringence of the first and second layers may be substantially equal to zero for a wavelength corresponding to the longest pitch of the cholesteric layer and substantially equal to but opposite that of the cholesteric layer for a wavelength corresponding to the shortest pitch of the cholesteric layer, and the first compensator may be disposed adjacent the second surface of the cholesteric layer.

The refractive index dispersions of the first and second layers may be such that:

$$|\Delta n_2(400)/\Delta n_2(700)-\Delta n_1(400)/\Delta n_1(700)|>0$$

where $\Delta n_1(400)$ and $\Delta n_1(700)$ are the birefringences of the first layer at wavelengths of 400 and 700 nanometres, respectively, and $\Delta n_2(400)$ and $\Delta n_2(700)$ are the birefringences of the second layer at wavelengths of 400 and 700 nanometres, respectively.

The first layer may comprise a reactive mesogenic material. The first layer may comprise a homeotropically aligned reactive mesogenic material.

The first layer may comprise part of the cholesteric layer having a predetermined alignment.

The first layer may comprise at least one stretched polymer film.

The first layer may comprise a plurality of uniaxial films, each of which has negative birefringence and an optic axis substantially in the plane thereof, the optic axes of the or each adjacent pair of the uniaxial films being angularly spaced by a non-zero angle. The first layer may comprise two uniaxial films whose optic axes are substantially perpendicular to each other.

The first layer may comprise a plurality of biaxial films, each of which has a refractive index in a direction perpendicular to the film which is greater than the average of the refractive indices in the plane of the film, the optic axes corresponding to the smaller of the in-plane refractive indices of the or each adjacent pair of films being angularly spaced by a non-zero angle. The first layer may comprise two biaxial films whose optic axes corresponding to the smaller of the in-plane refractive indices are substantially perpendicular to each other.

The second layer may comprise a cholesteric layer having a pitch corresponding to a wavelength of less than substantially 440 nanometres. The second layer may comprise part of the cholesteric layer.

The second layer may comprise a cast polymer film. The polymer may be a polyimide.

The second layer may comprise a discotic liquid crystal material.

The second layer may comprise at least one stretched polymer film.

The second layer may comprise a plurality of films, each of which comprises a uniaxial material having an optic axis in the plane thereof, the optic axes of the or each adjacent pair of films being angularly spaced by a non-zero angle. The second layer may comprise two films and the optic axes may be substantially perpendicular to each other.

The second layer may comprise a plurality of biaxial films, each of which has a refractive index in a direction perpendicular to the film which is less than the average of the refractive indices in the plane of the film, the optic axes corresponding to the greater of the in-plane refractive indices of the or each adjacent pair of films being angularly spaced by a non-zero angle The second layer may comprise two biaxial films whose optic axes corresponding to the greater of the in-plane refractive indices are substantially perpendicular to each other.

The first compensator may include an on-axis retarder. The retarder may be a quarter waveplate.

The cholesteric layer may be disposed between the first compensator and a second compensator, which comprises a plurality of layers, a first of which has positive birefringence and an optic axis substantially perpendicular to the first layer and a second of which has negative birefringence and an optic axis substantially perpendicular to the second layer. The second layer may include an on-axis retarder. The retarder may be a quarter waveplate.

According to a second aspect of the invention, there is provided a polariser characterised by comprising a device according to the first aspect of the invention.

According to a third aspect of the invention, there is provided a filter characterised by comprising a device according to the first aspect of the invention.

According to a fourth aspect of the invention, there is provided a liquid crystal device characterised by including a device according to the first aspect of the invention.

According to a fifth aspect of the invention, there is provided a polarising beam-splitter characterised by comprising a device according to the first aspect of the invention.

It is thus possible to provide a device which makes use of dispersion to vary the amount of off-axis birefringence with wavelength so as to reduce or compensate for wavelength-dependent off-axis birefringence of a broadband cholesteric layer. For instance, the intensity and polarisation of transmitted and reflected light from a cholesteric layer may be controlled as a function of wavelength, polarisation and angle of incidence of illuminating light. Further on-axis retarding layers may be included to convert input or output polarisation states to a polarisation state required for a particular application. The dependence on the angle of incidence and/or the angle of emergence of the optical performance of the device may be substantially reduced. It is therefore possible to provide devices such as polarisers and spectral filters of improved performance over a relatively large range of angles of incidence and/or emergence.

BRIEF DESCRIPTION OF THE DRAWINGS

The invention will be further described, by way of example, with reference to the accompanying drawings in which:

FIG. 5b illustrates diagrammatically a simplified structure of part of the layer of FIG. 5a;

FIGS. 8a to 8d are similar to FIGS. 6a to 6d, respectively, illustrating the simulated performance of a thick reflecting layer;

FIGS. 12a to 12d are similar to FIGS. 11a to 11d, respectively, for a device of the type shown in FIG. 10 from which a compensator has been omitted;

DETAILED DESCRIPTION OF THE PREFERRED EMBODIMENTS

Figure 1A:
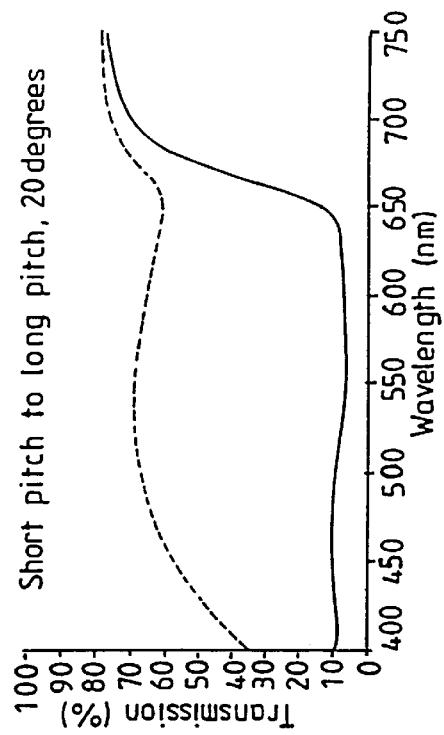
FIGS. 1a to 1c are graphs of transmission in percent against wavelength in nanometres of a known broadband cholesteric polariser for different angles of incidence.

Like reference numerals refer to like parts throughout the drawings.

FIG. 1a of the accompanying drawings is a graph of transmittance in percent against wavelength in nanometres illustrating the performance of a known polariser. The polariser comprises a broadband left-handed monotonically graded pitch cholesteric film illuminated on its shorter pitch surface by white light with an angle of incidence of zero degrees. The unbroken line illustrates the transmittance of right handed circularly polarised light whereas the broken line illustrates the transmittance of left-handed circularly polarised light. In order to act as an achromatic broadband polariser, the ideal performance would be for the left handed circularly polarised light to be transmitted with a uniform transmittance across the whole of the visible spectrum with minimal insertion loss whereas the right handed circularly polarised light would be uniformly attenuated across the visible spectrum with maximal attenuation. As shown in FIG. 1a, the on-axis performance of the known type of polariser approaches the ideal performance and is adequate for many practical applications.

Figure 1B:
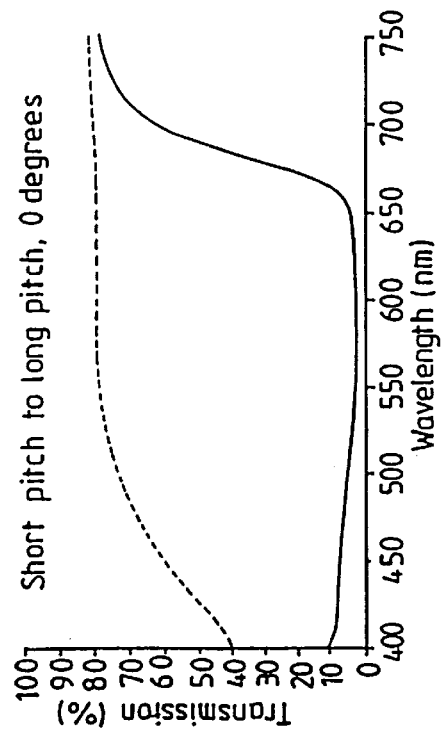

FIG. 1b is a graph similar to that of FIG. 1a but illustrates the performance for light which is incident on the short pitch surface at 20 degrees. The attenuation performance for right handed circularly polarised light is slightly degraded and the curve for left handed circularly polarised light is showing signs of some degradation of achromatic performance.

Figure 1C:
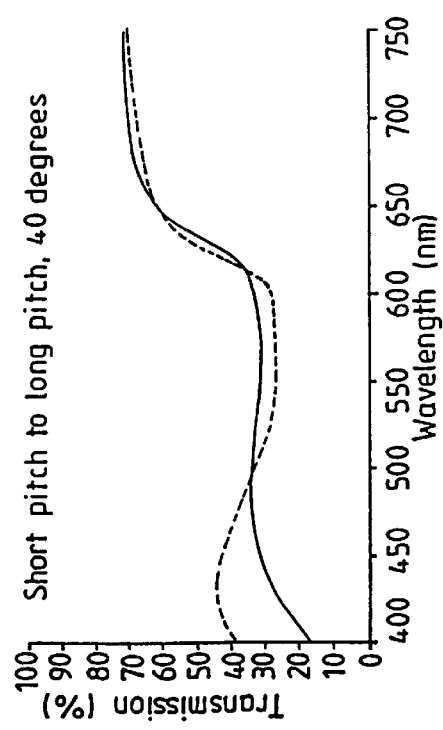

FIG. 1c illustrates operation for light incident at 40 degrees. The transmittance curves for left handed and right handed circularly polarised light are similar so that the extinction ratio (ratio of transmittance of the desired polarisation to the transmittance of the undesired polarisation) is very poor and, throughout part of the visible spectrum, is negative. Thus, as the angle of incidence increases, the performance of the broadband polariser deteriorates until, at angles of incidence of the order of 40 degrees, the polariser ceases to act as a polariser at all.

Figure 2B:
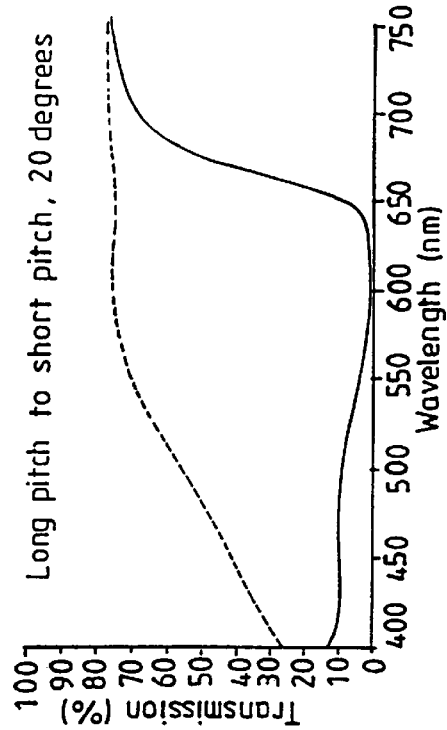
FIGS. 2a to 2c are graphs similar to FIGS. 1a to 1c, respectively, showing the performance for light passing in the opposite direction.
Figure 2A:
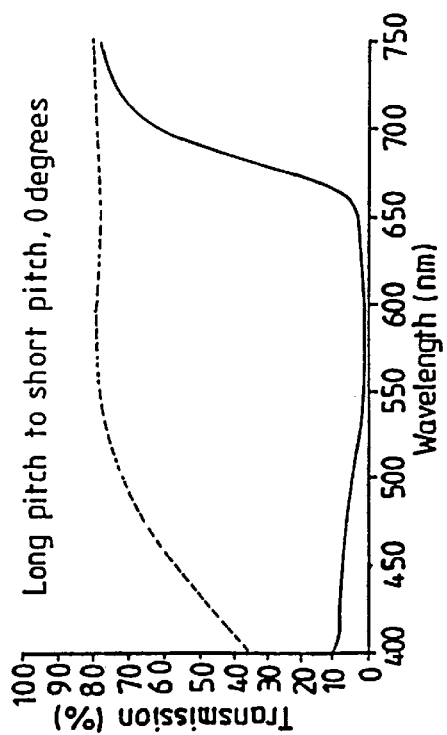
Figure 2C:
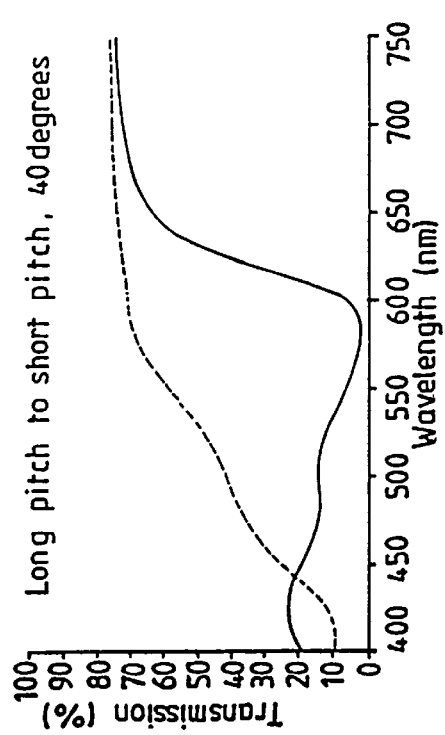
Figure 3B:
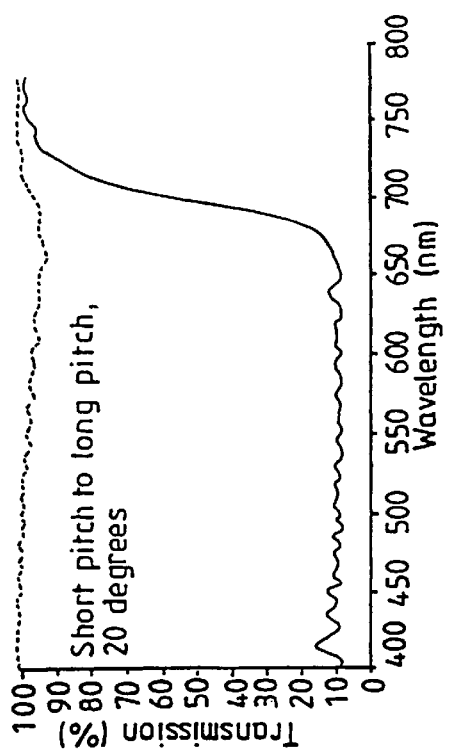
FIGS. 3a to 3c are graphs similar to FIGS. 1a to 1c, respectively, illustrating simulated performance of a known type of cholesteric device.
Figure 3A:
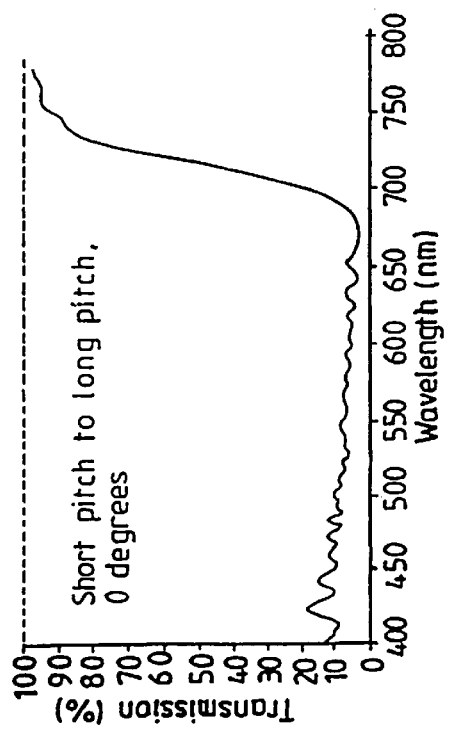
Figure 3C:
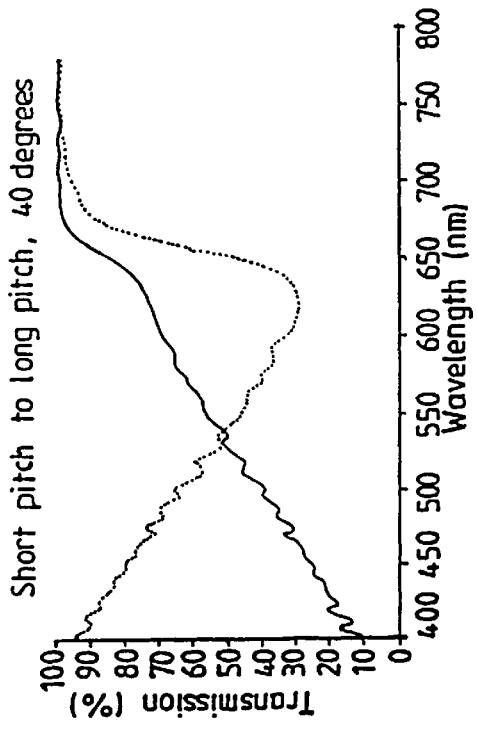
Figure 4A:
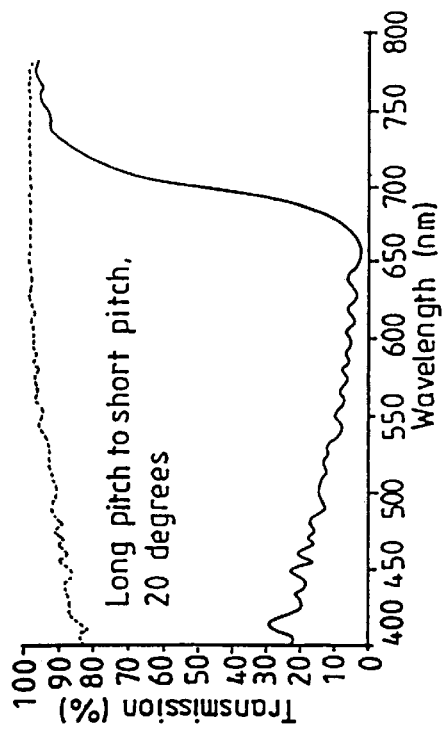
FIGS. 4a to 4c are similar to FIGS. 2a to 2c, respectively, illustrating simulated performance of a known type of cholesteric device.
Figure 4B:
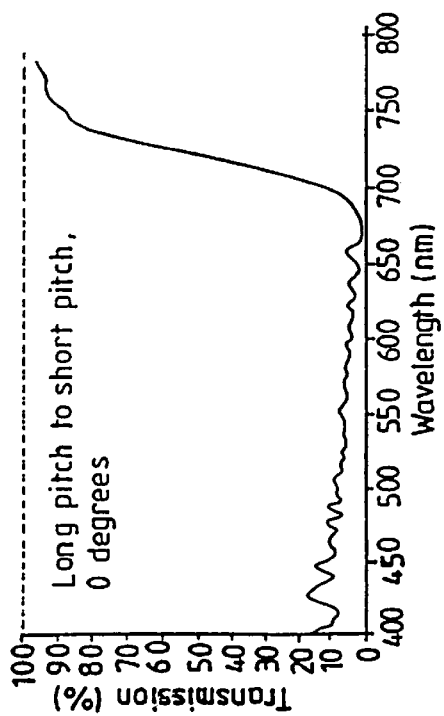
Figure 4C:
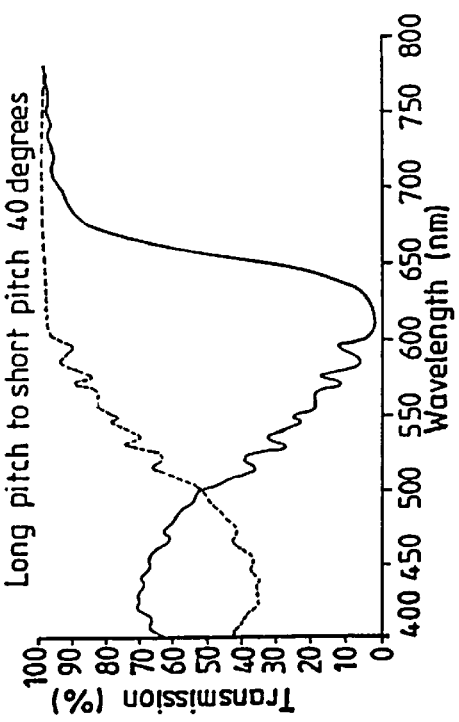

FIGS. 2a to 2c of the accompanying drawings correspond to FIGS. 1a to 1c, respectively, but illustrate the performance for light incident at angles of 0, 20 and 40 degrees on the long pitch surface of the broadband polariser. Again, the performance deteriorates with increasing angle of incidence such that the achromaticity of the polariser reduces and the extinction ratio reduces until, for high angles of incidence, the polariser ceases to be effective at all for at least part of the visible spectrum.

FIGS. 3a to 3c and 4a to 4c correspond to FIGS. 1a to 1c and 2a to 2c, respectively, but illustrate the results of a simulation using a 4×4 transfer matrix optics modelling program. The simulated performance represents a reasonably close approximation to the performance actually obtained and assists in understanding the mechanisms involved in degrading the optical performance of the broadband polariser.

Figure 5A:
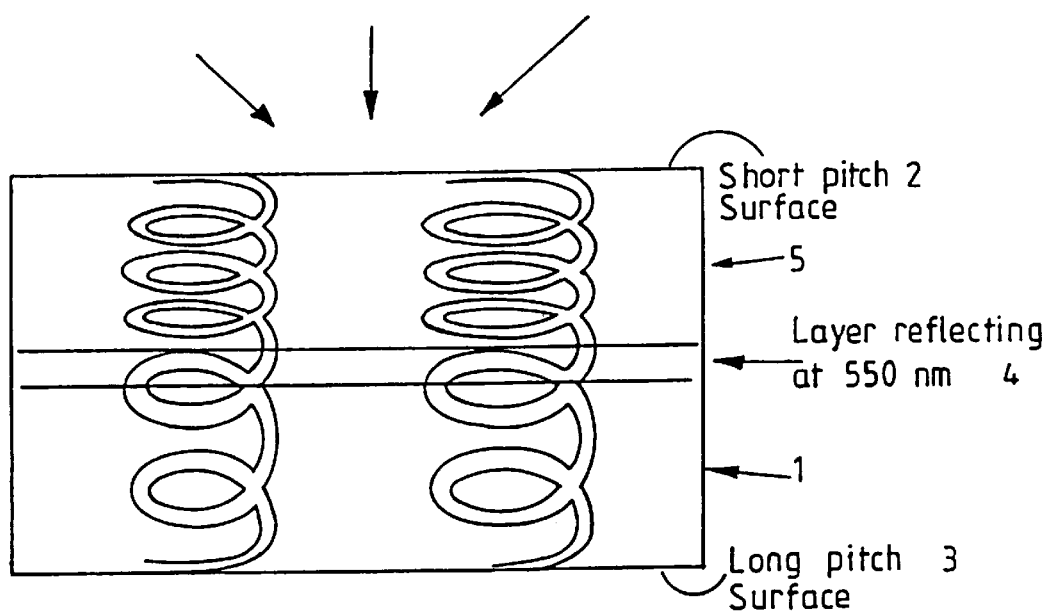
FIG. 5a is a diagrammatic representation of a known single layer cholesteric reflector.

The response may be understood in terms of the off-axis birefringence of the thick cholesteric layer which is optically in front of the layers of cholesteric material at some distance from the illuminated surface of the polariser. For example, the region of the broadband polariser which reflects circularly polarised light at a wavelength of 550 nanometres is separated from the light source by a thick layer of cholesteric liquid crystal polymer (CLCP) which alters the polarisation state of the off-axis incident polarised light. This is illustrated in FIG. 5a, which shows the polariser 1 having a short pitch surface 2 and a long pitch surface 3. An intermediate layer 4 is responsible for reflection at 550 nanometres but the portion of the polariser between the layer 4 and the surface 2 alters the polarisation state of the off-axis incident light.

Figure 5B:
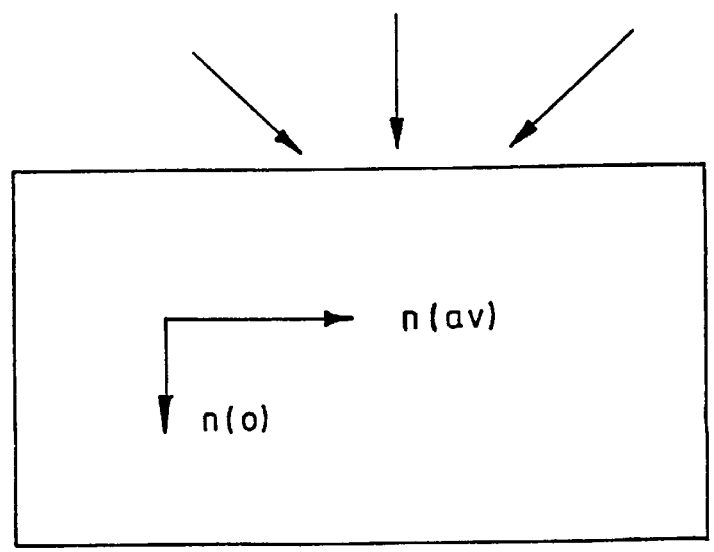
Figure 6A:
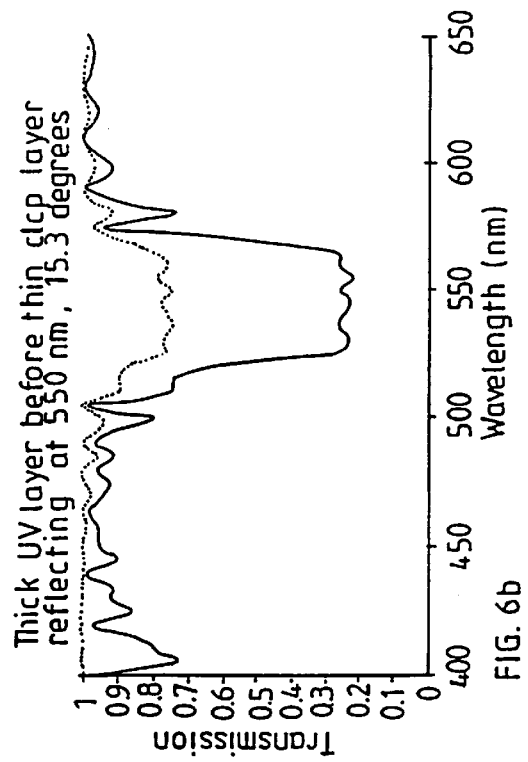
FIGS. 6a to 6d are graphs of transmission against wavelength in nanometres illustrating simulated performance of a device of the type shown in FIG. 5a for different angles of incidence.
Figure 6B:
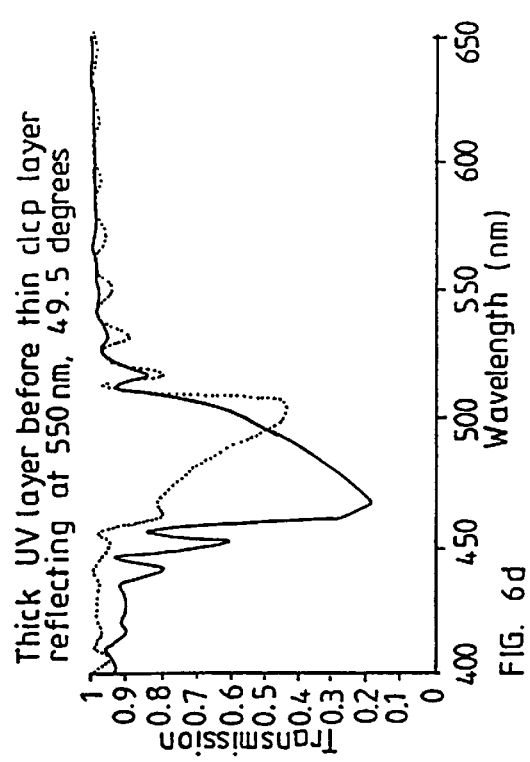
Figure 6C:
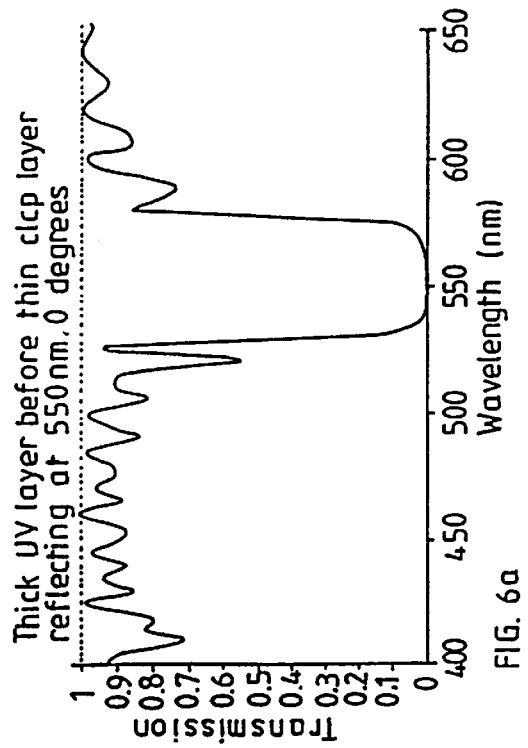
Figure 6D:
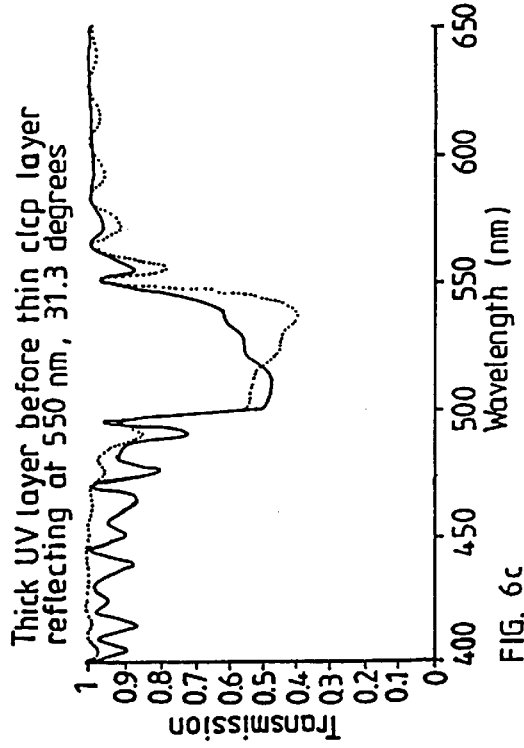
Figure 7B:
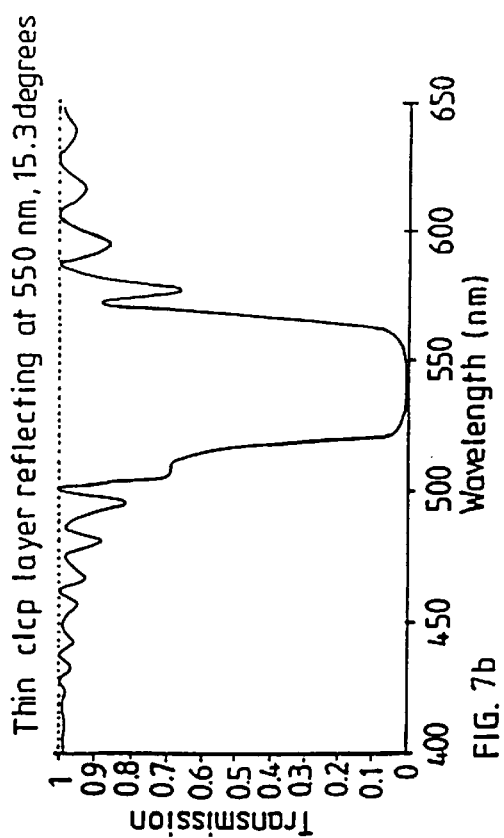
FIGS. 7a to 7d are similar to FIGS. 6a to 6d, respectively, for a device comprising a thin reflecting layer.
Figure 7D:
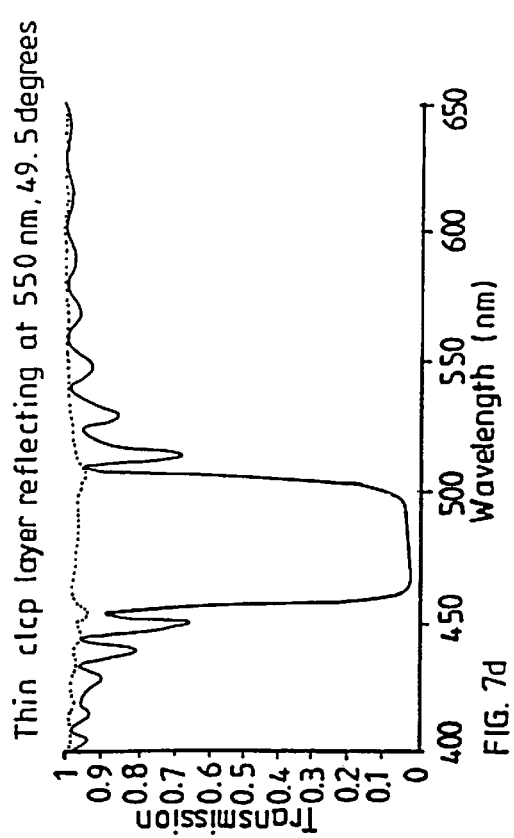
Figure 7A:
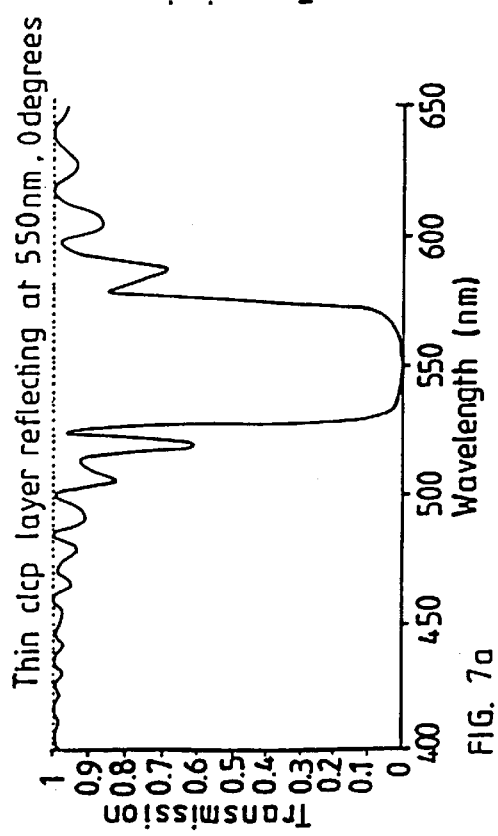
Figure 7C:
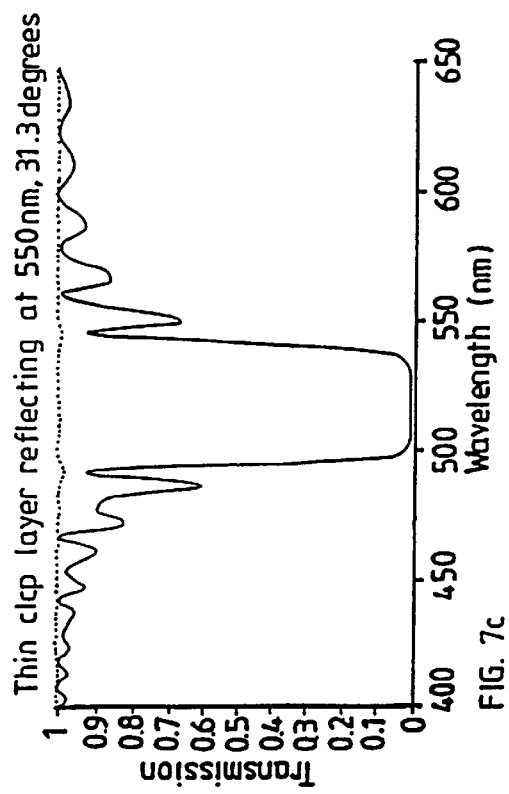
Figure 9B:
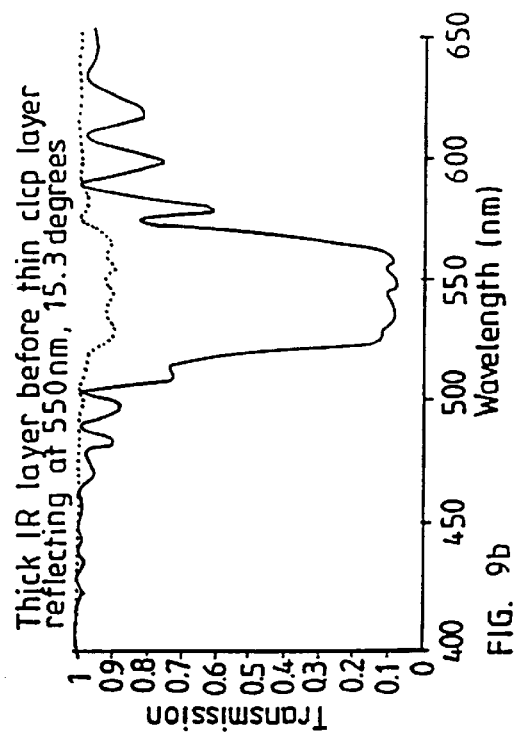
FIGS. 9a to 9d are similar to FIGS. 7a to 7d, respectively, illustrating the simulated performance of a thick reflecting layer covered by a thick infrared (IR) layer.
Figure 9D:
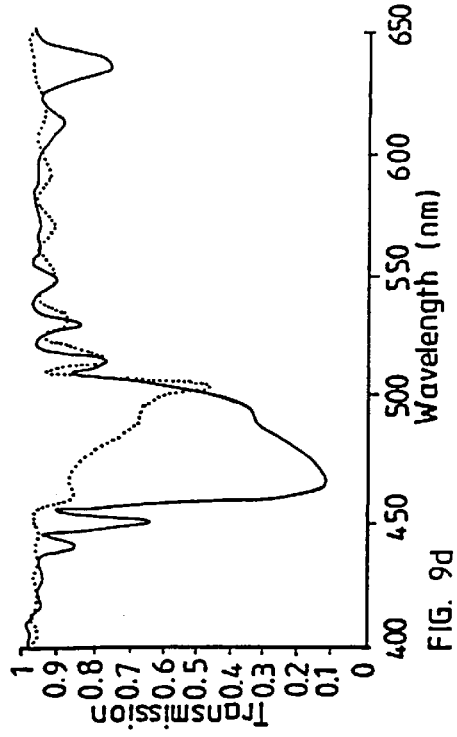
Figure 9A:
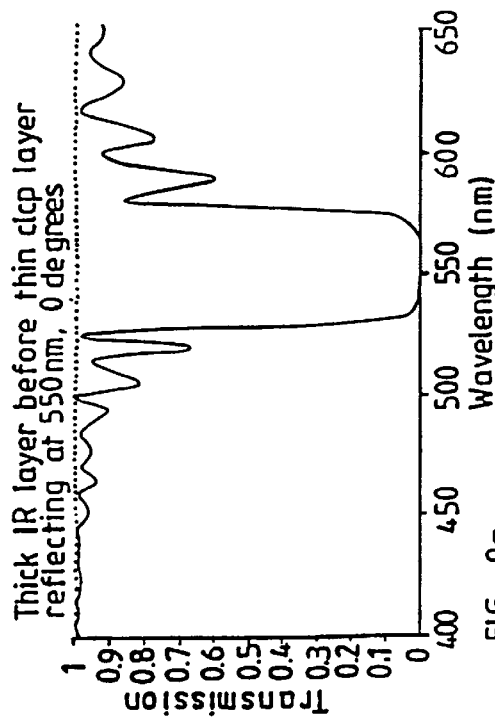
Figure 9C:
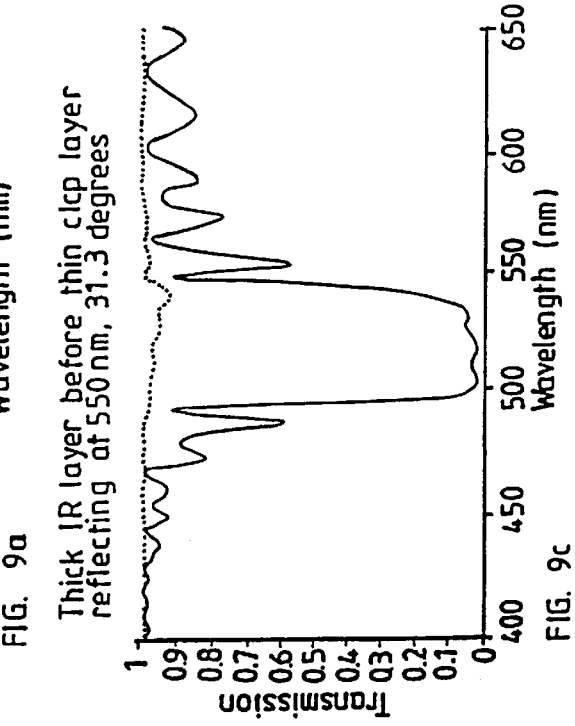

The effect of this thick intermediate layer 5, which has a smaller pitch than that of the layer 4 for reflecting light at 550 nanometres at normal incidence, may be considered by approximating the layer 5 of varying pitch by means of a layer of constant pitch which is much smaller than the pitch of the layer 4. In this case, the chiral nature of the thick layer 5 is not "visible" to incident light of 550 nanometre wavelength. To a first approximation, such light sees the "averaged structure" illustrated in FIG. 5b. The layer 5 is thus simulated as a layer whose pitch corresponds to UV wavelengths.

FIGS. 6a to 6d are graphs of transmission against wavelength for light incident on the simulated structure comprising the UV layer and the layer 4 at angles of incidence of zero, 15.3, 31.3 and 49.5 degrees, respectively. FIGS. 7a to 7d correspond to FIGS. 6a to 6d, respectively, but for a simulation in which the UV layer is omitted. These results illustrate that, off-axis, the polarisation state of the incident light is substantially affected by the thick UV layer such that right handed circularly polarised light is partially converted to left handed circularly polarised light, which is not reflected by the layer 4 reflecting at 550 nanometres. Further, the left handed circularly polarised light is partially converted to right handed circularly polarised light which is reflected by the layer 4. Thus, the averaged structure illustrated in FIG. 5b has a performance which is consistent with the effects of off-axis birefringence and this is believed to be the mechanism which causes the off-axis deterioration in performance.

FIGS. 8a to 8d correspond to FIGS. 7a to 7d, respectively, but illustrate the simulated result where the thin CLCP layer 4 reflecting at 550 nanometres wavelength is covered by a thick CLCP of the same pitch and thus reflecting at the same wavelength as the layer 4. Averaging of the chiral structure does not take place and, for the parameters and angles illustrated, there is negligible difference between the off-axis behaviour of the thin and thick "green" layers as may be seen by comparing FIGS. 7a to 7d with FIGS. 8a to 8d, respectively.

FIGS. 9a to 9d correspond to FIGS. 7a to 7d but illustrate the effect of covering the thin layer 4 with a thick layer which has a larger pitch such that it is reflective to infrared radiation on-axis. The presence of this layer affects performance as illustrated in FIGS. 9a to 9d. However, as may be seen by comparing FIGS. 6a to 6d with FIGS. 9a to 9d, respectively, the effect of the thick layer depends on whether its pitch is greater or less than that of the layer 4 having a pitch capable of reflecting the incident light.

Figure 10:
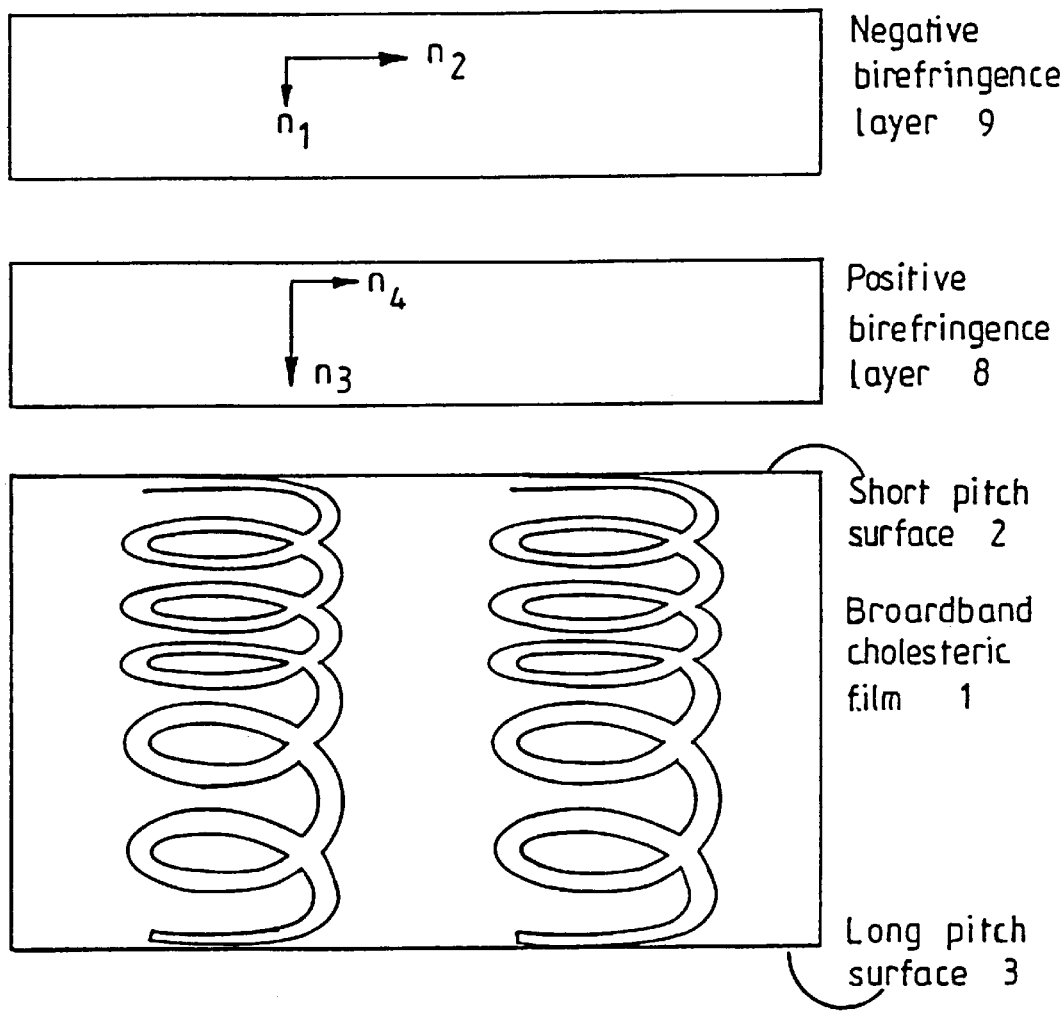
FIG. 10 is a diagram illustrating the structure of an optical device constituting a first embodiment of the invention.

The device shown in FIG. 10 constitutes an embodiment of the invention and is a broadband polariser for reflecting circularly polarised light of a first handedness and for transmitting circularly polarised light of a second handedness throughout the visible spectrum. The device comprises a broadband cholesteric film 1 having a graded pitch which varies monotonically from a short pitch surface 2 of the film 1 to a long pitch surface 3. The film 1 is, for instance, of the same type as that shown in FIG. 5a.

A positive birefringence layer 8 is disposed adjacent or in contact with the short pitch surface 2 of the film 1. The layer 8 is 14.3 micrometres thick and has ordinary and extraordinary refractive indices n4 and n3 such that n4 is less than n3 and the optic axis is substantially perpendicular to the layer 8 and parallel to the axis of the device. For instance, the extraordinary refractive index n3 may have a value of 1.7 at a wavelength of 400 nanometres and 1.55 at a wavelength of 700 nanometres. The ordinary refractive index n4 may have a value of 1.5 at a wavelength of 400 nanometres and 1.36 at a wavelength of 700 nanometres.

The positive birefringence layer 8 is disposed between the broadband cholesteric film 1 and a negative birefringence layer 9 which is 11 micrometres thick.

The optic axis of the layer 9 is substantially perpendicular to the layer and parallel to the optical axis of the device. The layer 9 has an ordinary refractive index n2 of 1.70 at a wavelength of 400 nanometres and 1.55 at a wavelength of 700 nanometres. The layer 9 has an extraordinary refractive index n1 of 1.5 at 400 nanometres and 1.41 at 700 nanometres. The layers 8 and 9 are uniaxial.

The phase retardation of the films 8 and 9 at oblique incident angles is given by:

$$\delta(\theta,\lambda) = 2\pi d \Delta n / \lambda \cos\theta \tag{1}$$

where $\theta$ is the incident angle of light in the LC medium, $\lambda$ is the wavelength, d is the film thickness and $\Delta n$ is given by:

$$\Delta n_{(1,2)} = n_1 n_2 (n_1^2 \cos^2\theta + n_2^2 \sin^2\theta)^{-1/2} - n_2 \tag{2}$$

for the layer 9 and $$\Delta n_{(3,4)} = n_3 n_4 (n_3^2 \cos^2\theta + n_4^2 \sin^2\theta)^{-1/2} - n_4 \tag{3}$$

for the layer 8 of the double layer compensator.

The total phase retardation of the two layers 8, 9 is given by the sum of the phase retardations of the two films:

$$\delta(\theta,\lambda)_{1,2} + \delta(\theta,\lambda)_{3,4} = 2\pi (d_{12}\Delta n_{(1,2)} + d_{34}\Delta n_{(3,4)})/\lambda\cos\theta \tag{4}$$

This phase retardation depends on wavelength both due to the explicit $\lambda$ term in equation (4) as well as the dispersion of the refractive indices $n_1$, $n_2$, $n_3$, and $n_4$.

The dispersions and thicknesses of the layers 8, 9 are arranged such that the amount of off-axis phase retardation, or off-axis birefringence, varies with wavelength so as to counteract the depth-dependence of the off-axis birefringence of the graded-pitch cholesteric film 1. Provided that the pitch of the cholesteric film varies monotonically from one face to the other, improved angular response can be achieved with a simple double-layer compensator of the form shown in FIG. 10. Compensation can be achieved also by placing the negative birefringence layer 9 closer to the cholesteric layer 1 than the positive birefringence layer 8.

Where the compensator is next to the short pitch surface 2, the dispersion of the materials of the layers 8 and 9 should be such that:

$$(\Delta n_9(400)/\Delta n_9(700)) - (\Delta n_8(400)/\Delta n_8(700)) > 0$$

where $\Delta n$ is the magnitude of the difference between the refractive indices in the plane and perpendicular to the plane, $\Delta n_9(400)$ and $\Delta n_9(700)$ are the differences for the layer 9 at wavelengths of 400 and 700 nanometres, respectively, and $\Delta n_8(400)$ and $\Delta n_8(700)$ are the differences for the layer 8 at wavelengths of 400 and 700 nanometres, respectively.

Polarised light propagating through a slab of cholesteric material of longer pitch than the wavelength of light experiences significant circular birefringence in addition to linear birefringence. This is not removed by the present arrangement. Consequently, it is preferred to have the compensation next to the short pitch surface 2 of the cholesteric film if compensation at only one side of the device is required.

In the case where the compensator is next to the long pitch surface 3 (as described hereinafter), reasonable compensation may be achieved if the dispersion of the materials of the layers 8 and 9 are such that:

$$(\Delta n_8(400)/\Delta n_8(700)) - (\Delta n_9(400)/\Delta n_9(700)) > 0$$

For the device shown in FIG. 10, at the wavelength corresponding to the shortest pitch of the cholesteric film 1, no off-axis birefringence is required and the off-axis retardance of the two layers of the compensator substantially cancel. In particular, because the retardations of the layers 8 and 9 are of opposite sign, it is possible to choose the relative thickness of the layers 8 and 9 so that, at a wavelength corresponding to the shortest pitch of the cholesteric film 1, the retardations of the layers 8 and 9 substantially cancel each other over a wide range of angles.

Conversely, at the wavelength corresponding to the longest pitch of the cholesteric film 1, off-axis birefringence of equal magnitude but opposite sign to the off-axis birefringence of the cholesteric film 1 at that wavelength is required.

The dispersion of the negative birefringence layer 9 is greater than the dispersion of the positive birefringence layer 8. In other words, the birefringence of the negative birefringence layer 9 decreases at a faster rate with increasing wavelength than for the positive birefringence layer 8. For wavelengths corresponding to the longest pitch of the cholesteric film 1, the combination of the positive and negative birefringence films 8 and 9 can be approximated as a positive birefringence structure and the cholesteric film 1 can be approximated as a negative birefringence structure. The overall thickness of the layers 8 and 9 is then chosen so as to roughly cancel the effects of the negative birefringence of the cholesteric film 1.

For more complex pitch variations, a compensator comprising more than two layers may be required. Also, the compensator may be placed before and/or after the cholesteric film 1 to provide greater control of the angular behaviour. The correct location of the or each compensator depends on the application.

Figure 11A:
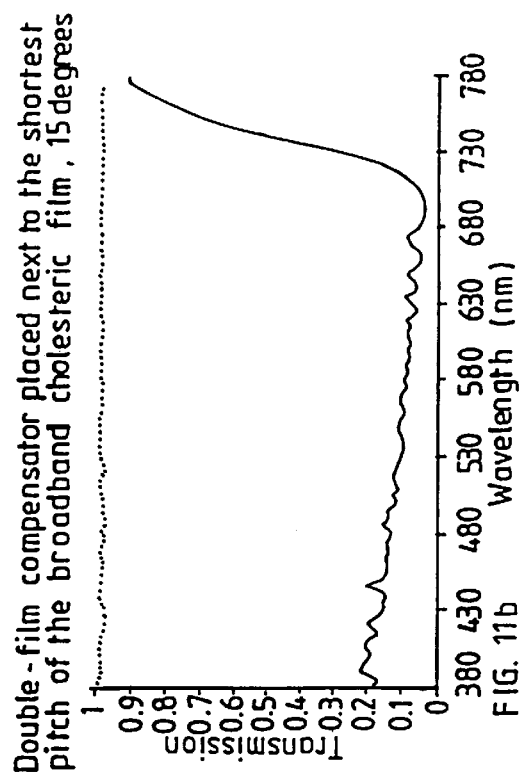
FIGS. 11a to 11d are graphs of transmission against wavelength in nanometres illustrating the simulated performance of the device of FIG. 10 for different angles of incidence.
Figure 11B:
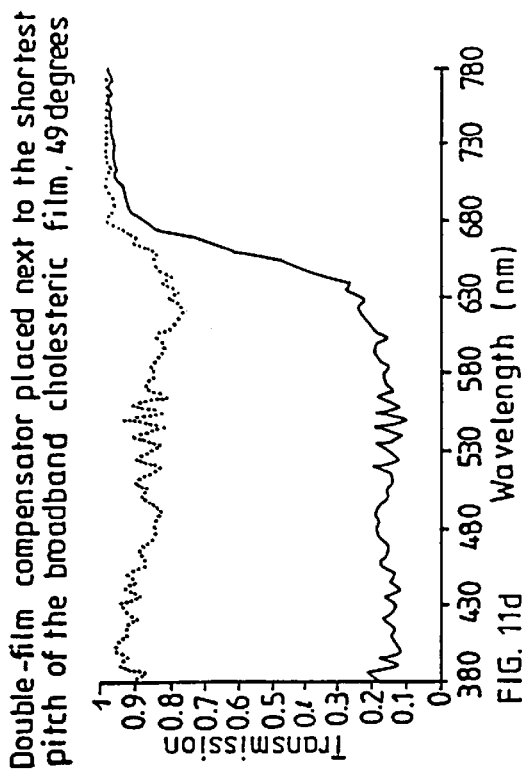
Figure 11C:
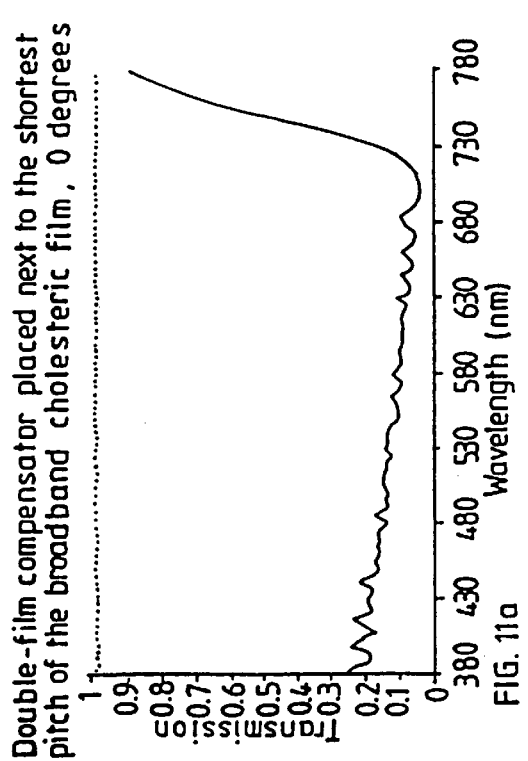
Figure 11D:
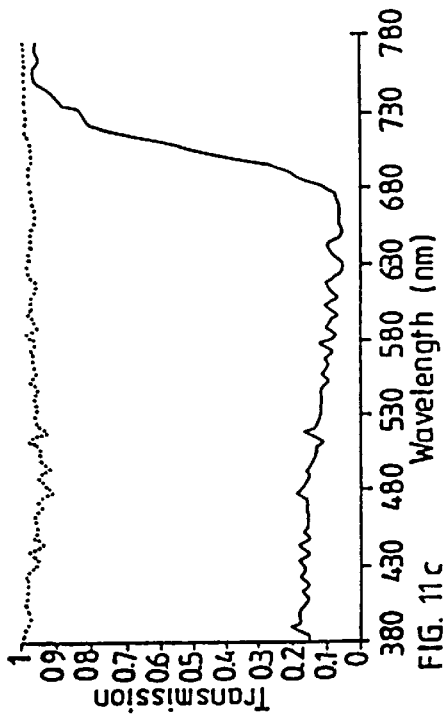

FIGS. 11a to 11d are graphs illustrating the performance of the device shown in FIG. 10 obtained by simulation. The unbroken curve illustrates the transmission of right handed circularly polarised light whereas the broken line curve illustrates the transmission of left handed circularly polarised light. FIG. 11a illustrates the on-axis performance i.e. for light incident at zero degrees, whereas FIG. 11b, 11c and 11d illustrate performance for light incident at 15, 31 and 49 degrees, respectively. As shown in each of these drawings, transmission of left handed circularly polarised light is high and varies little throughout the visible spectrum, even in the case of light incident at 49 degrees as shown in FIG. 11d. Also, attenuation of right handed circularly polarised light remains high throughout the visible spectrum and with substantially achromatic performance. The device therefore operates as a highly achromatic broadband polariser and maintains a good extinction ratio throughout the visible spectrum and for large angles of incidence.

Figure 13A:
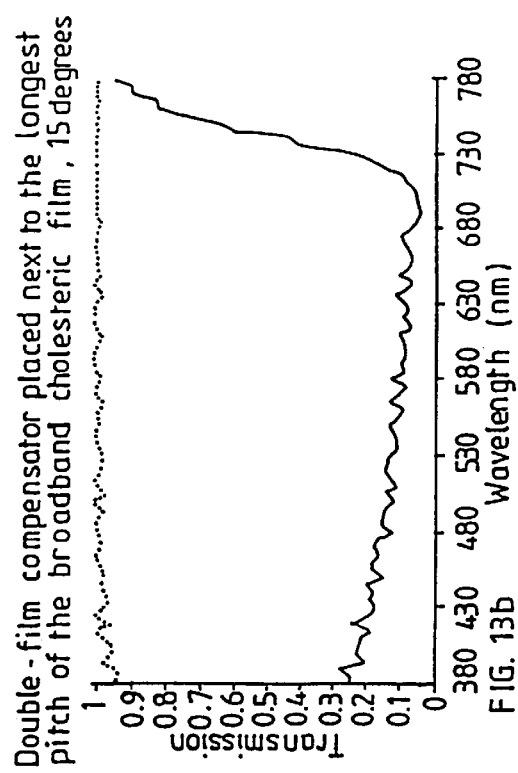
FIGS. 13a to 13d are similar to FIGS. 11a to 11d, respectively, for light passing in the opposite direction through the device.
Figure 13B:
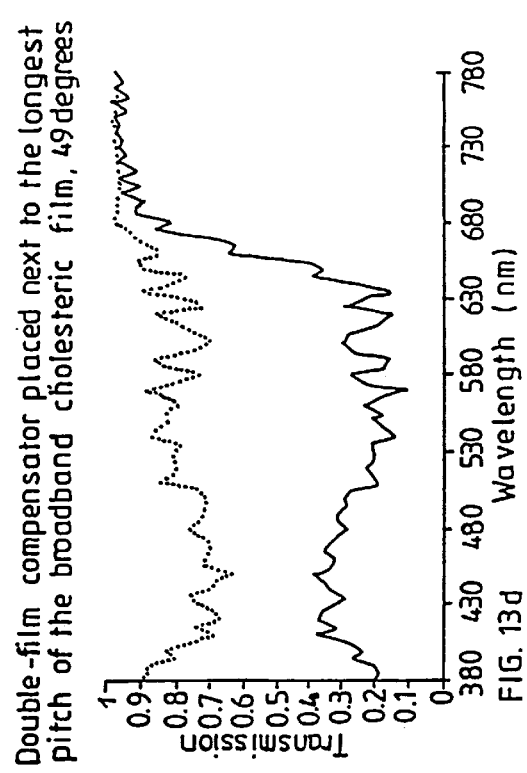
Figure 13C:
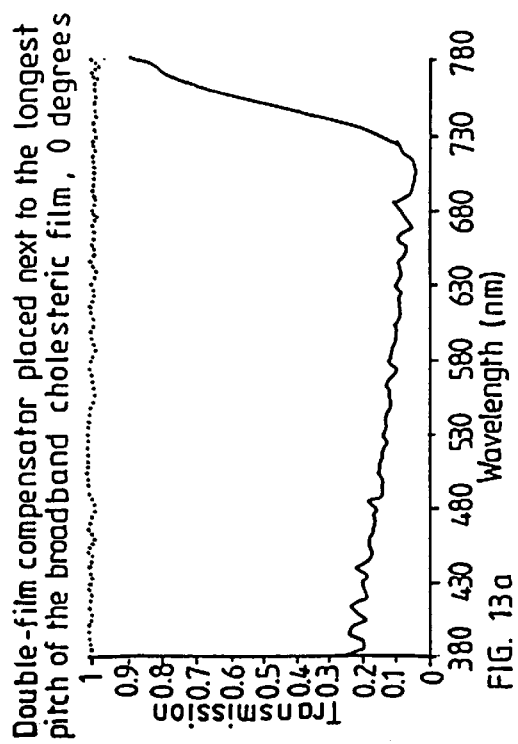
Figure 13D:
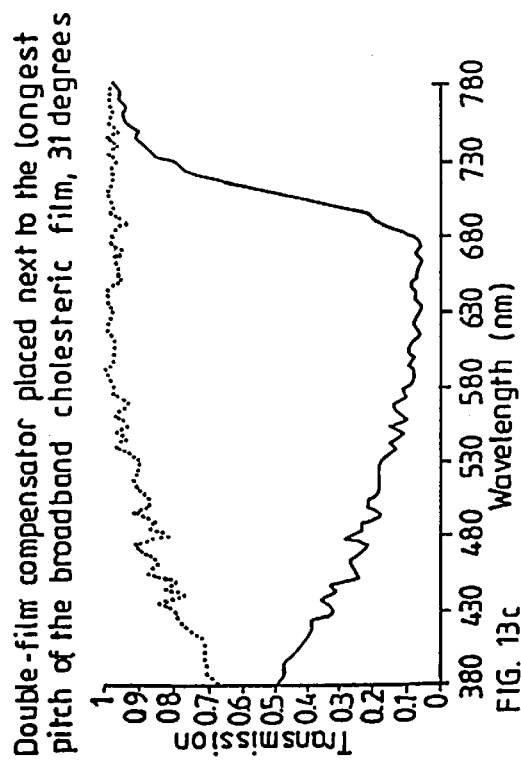
Figure 14A:
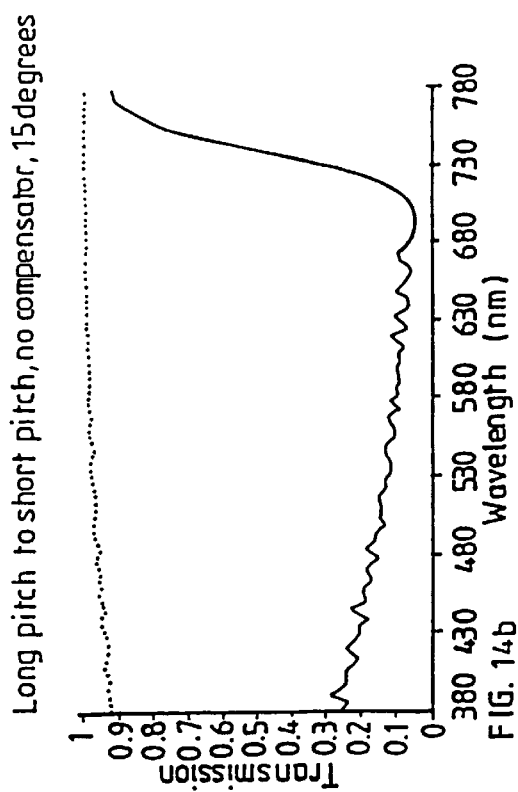
FIGS. 14a to 14d are similar to FIGS. 12a to 12d, respectively, for light passing in the opposite direction.
Figure 14B:
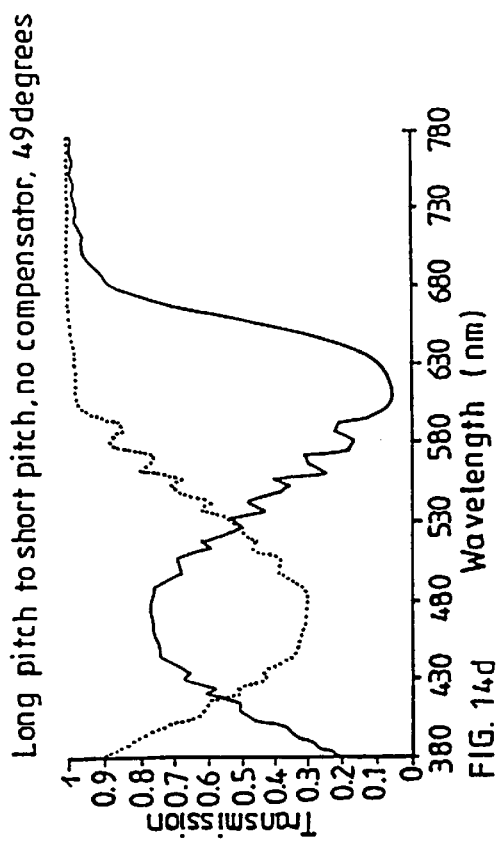
Figure 14C:
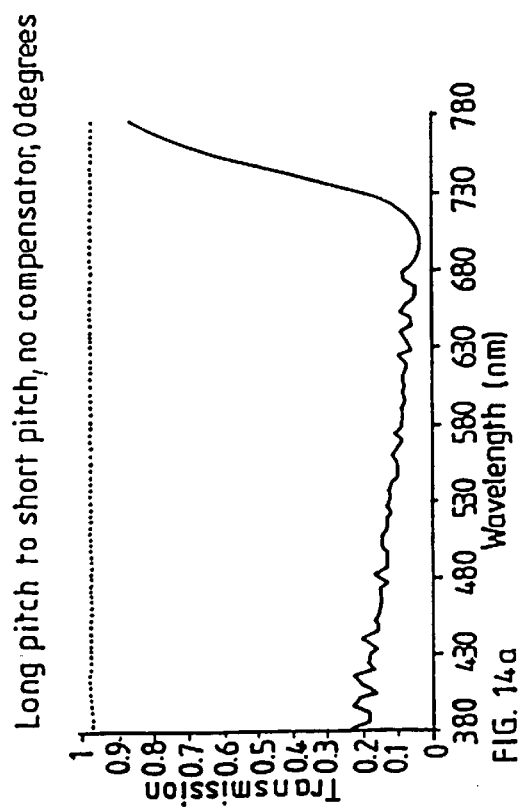
Figure 14D:
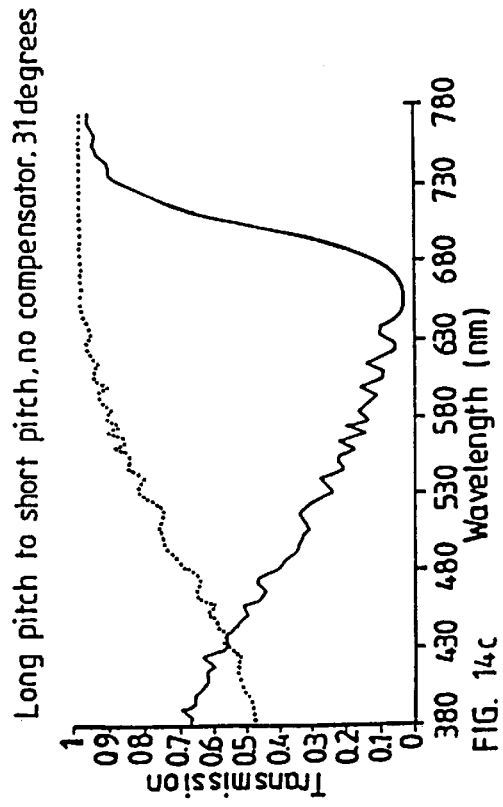

FIGS. 12a to 12d correspond to FIGS. 11a to 11d, respectively, but illustrate operation of the device shown in FIG. 10 with the compensator comprising the layers 8 and 9 removed. As shown in FIGS. 12a and 12b, the on-axis performance and performance for light which is incident at 15 degrees on the short pitch surface 2 is similar to the performance with the compensator as illustrated in FIGS. 11a and 11b. However, the performance deteriorates for larger angles of incidence as shown in FIGS. 12c and 12d. For a 31 degree angle of incidence, the device still functions as a polariser but the extinction ratio is seriously reduced for longer wavelength light and is no longer approximately achromatic. At a 49 degree angle of incidence, the performance has deteriorated to the point where the device is actually more transmissive to the undesired polarisation state than to the desired polarisation state. Thus, the presence of the compensator greatly increases the off-axis performance. FIG. 13a to 13d are graphs similar to FIG. 11a to 11d, respectively, but illustrate the performance of an alternative embodiment. The cholesteric film 1 is oriented such that light is incident toward the long pitch surface 3. The positive birefringence layer 8 and the negative birefringence layer 9 are disposed between the light source and the film 1 but differ from the layers described hereinbefore in that the positive birefringence film 8 has a thickness of 19.8 micrometres, an ordinary refractive index n4 of 1.56 at a wavelength of 400 nanometres, and 1.50 at a wavelength of 700 nanometres and an extraordinary refractive index n3 of 1.80 at 400 nanometres and 1.70 at 700 nanometres whereas the film 9 has a thickness of 15 micrometres, an ordinary refractive index n2 of 1.75 at 400 nanometres and 1.72 at 700 nanometres, and an extraordinary refractive index n1 of 1.56 at 400 nanometres and 1.51 at 700 nanometres. The simulated on-axis performance and performance for light incident at 15 degrees is shown in FIGS. 13a and 13b and illustrates good achromatic performance and extinction ratio throughout the visible spectrum. Although the performance deteriorates for angles of incidence of 31 and 49 degrees as shown in FIGS. 13c and 13d, the performance represents a substantial improvement over known devices and, in particular, the film 1 with the compensator comprising the layers 8 and 9 removed, as shown in FIGS. 14a to 14d. The performance on-axis and for a 15 degree angle of incidence is similar to the performance with the compensator but performance for higher angles of incidence deteriorates substantially as shown in FIGS. 14c and 14d.

There are a number of techniques and suitable materials for creation of the double-layer compensator. For example, the negative birefringence layer 9 may be fabricated from short pitch cholesteric material. This layer 9 may be incorporated with the broadband cholesteric polarising film 1 or may be separate. Alternatively, a suitably fabricated polyimide film may be used as disclosed in S. T. Wu, P-47, SID '95. The negative birefringence layer 9 may be fabricated from a suitable discotic LC material as disclosed in U.S. Pat. No. 5,518.783. A further alternative may be a biaxially stretched polymer film with little anisotropy in the plane. Furthermore, an effective negative birefringence layer may be fabricated from a two (or more) film stack of positive uniaxial or biaxial materials. Suitable materials may be nematic LC polymers which have planar alignment or stretched polymer films of materials exhibiting positive birefringence (i.e. an increased refractive index along the direction of stretching). The most suitable materials depend upon whether the compensator is next to the short pitch surface 2 or the long pitch surface 3. If the compensator is next to the short pitch surface 2, a high dispersion material is preferable. Suitable high dispersion materials may include biaxially oriented polyethylene naphtalate (Goodfellows, Cambridge, UK) with $\Delta n_{400}/\Delta n_{700} \sim 1.45$ or spin-coatable polyimides eg Ultradel PI-7505, (Amoco Chemical Company, Naperville, USA) $\Delta n_{400}/\Delta n_{700} \sim 1.3$. For the compensator next to the long pitch surface 3, suitable low dispersion materials may include VAC compensation film (Sumitomo Chemical Co., Japan) $\Delta n_{400}/\Delta n_{700} \sim 1.02$ or stacked films of stretched PVA (eg Polatechno, Japan) $\Delta n_{400}/\Delta n_{700} \sim 1.03$.

The positive birefringence layer 8 may be fabricated conveniently from a cured homeotropically aligned liquid crystal or liquid crystal polymer material, for instance as disclosed in EP 524 028. Also it may be possible to orient appropriately a cholesteric liquid crystal or liquid crystal polymer by use of surface effects or application of an electric or magnetic field to create the positive birefringence layer 8. In such a case, this layer may be essentially part of the cholesteric film 1. Additionally the positive birefringence layer may be fabricated from a biaxially stretched polymer film, stretched so that there is very little anisotropy in the plane. Such a film may be fabricated from a material exhibiting negative birefringence when stretched, i.e. exhibiting a decreased refractive index in the direction of stretching. Polymer materials exhibiting this property include polystyrene, poly methyl methacrylate (PMMA), ethylene methacrylate, and acrylonitrile polymers and co-polymers including stryrene acrylonitrile (SAN).

Furthermore, an effective positive birefringence layer may be fabricated from a two (or more) film stack of negative uniaxial or biaxial materials. For negative uniaxial materials, the optic axes are in the film plane but at an angle (90° for two films) to each other. For biaxial materials, the refractive index perpendicular to the plane is larger than the average of the refractive indices in the plane. The optic axes corresponding to the smallest in-plane refractive indices are at an angle (90° for two films) to each other. The films constituting the positive birefringence layer have similar optical dispersion properties.

For the compensator next to the short pitch surface 2, a low dispersion positive birefringence layer is required. A suitable material may be biaxially oriented polystyrene film eg OPS (Mitsubishi Chemical Co., Tokyo, Japan) $\Delta n_{400}/\Delta n_{700} \sim 1.15$. For the compensator next to the long pitch surface 3 a higher dispersion material is desirable. A suitable material may be a different grade of polystyrene eg AKD biaxially oriented polystyrene (AKD America Investment Corporation, Los Angeles, USA) $\Delta n_{400}/\Delta n_{700} \sim 1.29$ or a high birefringence homeotropically aligned liquid crystal polymer, for example as disclosed in EP 524 028. In general for liquid crystal materials, high birefringence is associated with a high dispersion factor as previously defined.

Although in theory the complete "external" compensator may be fabricated from the cholesteric reflecting film material, this is only convenient or feasible where there is sufficient control of the refractive indices and dispersion.

The final tuning of the off-axis birefringence of the external compensator may be achieved in situ, for example by use of temperature tuning of one of the refractive indices.

In addition, instead of decreasing the angular dependence, the optimum response of the cholesteric film/compensator combination may depend on the application. The compensator may be used to provide matching of the angular response of the cholesteric film to the specific application, such as use with a particular LCD. In such a case, the luminance enhancement achievable by use of a cholesteric film in a recirculating backlight system may be obtained without degrading other features of the system, such as viewing angle or colour balance.

Quarter wave films or other appropriate on-axis retarders may be integrally combined with the off-axis birefringence compensator.

Figure 15:
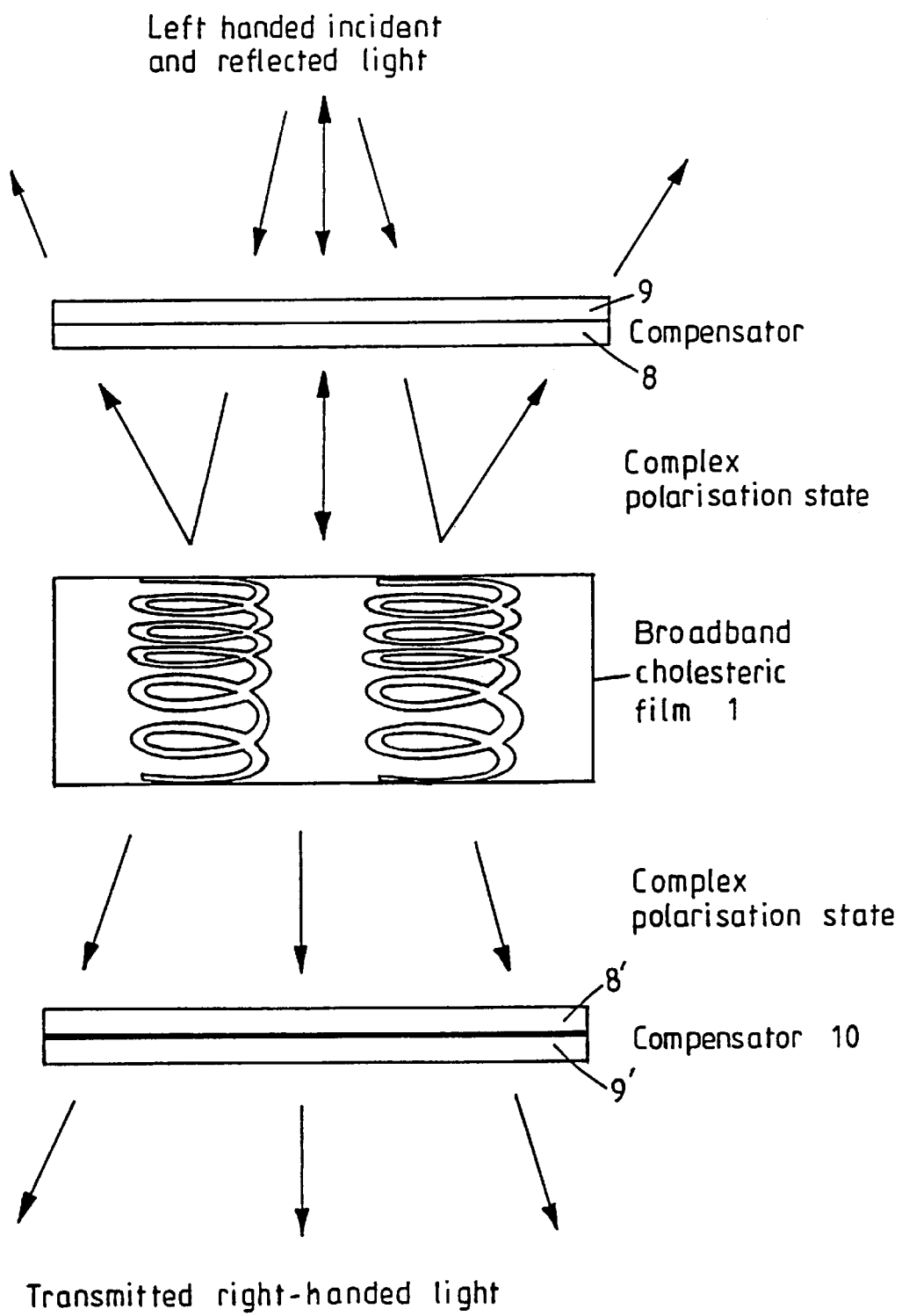
FIG. 15 is a diagram showing an optical device constituting a second embodiment of the invention.

FIG. 15 illustrates a device which differs from that shown in FIG. 10 in that a further compensator 10 is provided for emergent light leaving the cholesteric film 1. The compensator 10 comprises, for instance, a positive birefringence layer 8' and a negative birefringence layer 9' of the same types as the layers 8 and 9 of the first compensator. Light which is transmitted beyond the layer within the film 1 which reflects left handed circularly polarised light of that wavelength passes through the remainder of the cholesteric film 1 and suffers from the effects of off-axis birefringence. Consequently, light which emerges from the film 1 is not right handed circularly polarised for all wavelengths and at off-axis angles of emergence. The second compensator 10 may be used to counteract these effects so that the light which is transmitted through the whole device is mainly right handed circularly polarised throughout the visible spectrum over a large range of angles of emergence.

Figure 16:
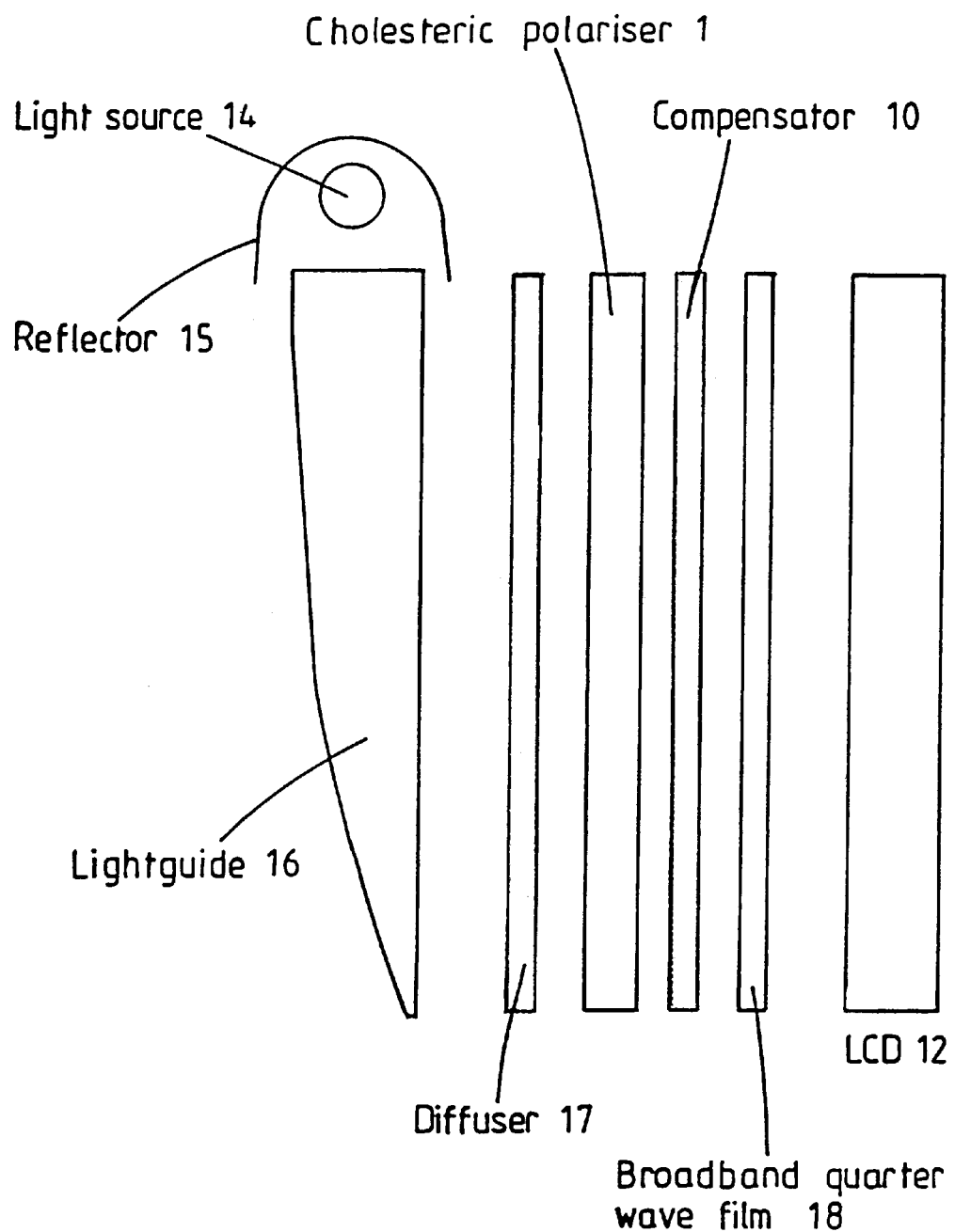
FIG. 16 illustrates diagrammatically a backlight arrangement for an LCD constituting a third embodiment of the invention.

FIG. 16 illustrates the use of a device comprising a cholesteric polariser 1 and an output compensator 10 in a backlight for an LCD 12. The backlight comprises a light source 14 and reflector 15 which supply light to a light guide 16. Light from the guide 16 is diffused by a diffuser 17 and supplied to the cholesteric polariser 1. Circularly polarised light of one handedness is reflected by the polariser 1 and may be recycled after reversing of its handedness of polarisation. Light of the other handedness of circular polarisation is transmitted by the polariser and the compensator 10 ensures that the output light is substantially of the single handedness of circular polarisation. A broadband quarter wave film 18 converts the circularly polarised light to linearly polarised light with a polarisation vector suitable for application to the LCD 12. The backlight arrangement shown in FIG. 16 thus achieves high efficiency of use of the light supplied by the light source 14.

Figure 17:
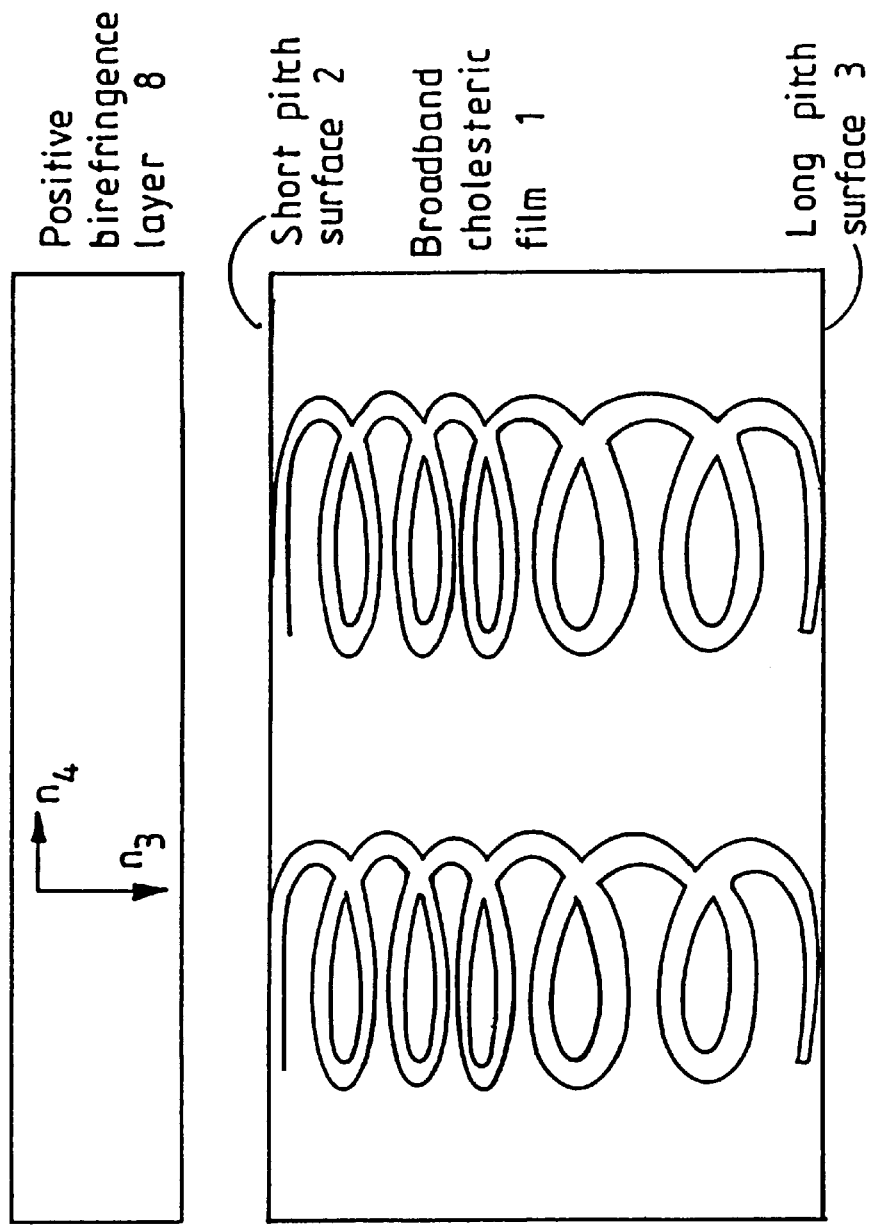
FIG. 17 is a diagram illustrating the structure of an optical device constituting a fourth embodiment of the invention.

Various modifications may be made within the scope of the invention. For instance, as shown in FIG. 17, the negative birefringence layer 9 may be omitted from the device shown in FIG. 10 to provide a simpler device whose performance is not as good as that of the device shown in FIG. 10 but may be acceptable for some applications. The positive birefringence of the layer 8 may be chosen to offset the negative birefringence experienced, for example, by green light with a wavelength range in the centre of the visible spectrum. The performance of such a simplified device is illustrated in FIGS. 18a to 18d. The layer 8 has an extraordinary refractive index n3 of 1.7 at 400 nanometres and 1.66 at 700 nanometres. The ordinary refractive index n4 of the layer is 1.65 at 400 nanometres and 1.62 at 700 nanometres.

Figure 18A:
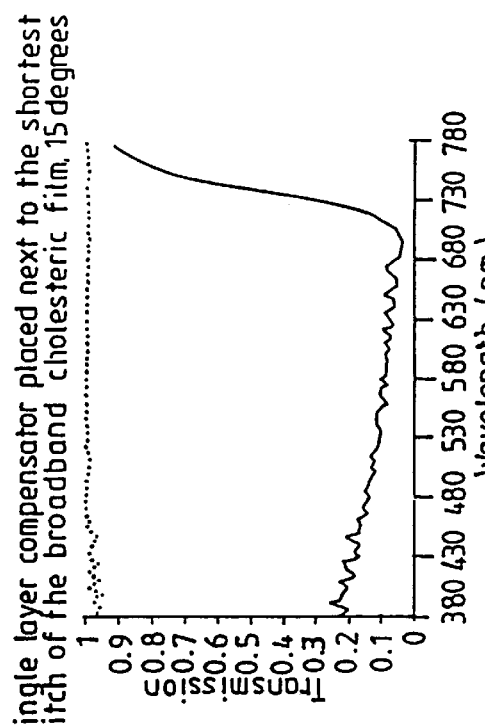
FIGS. 18a to 18d are similar to FIGS. 11a to 11d, respectively, for the optical device of FIG. 17.
Figure 18B:
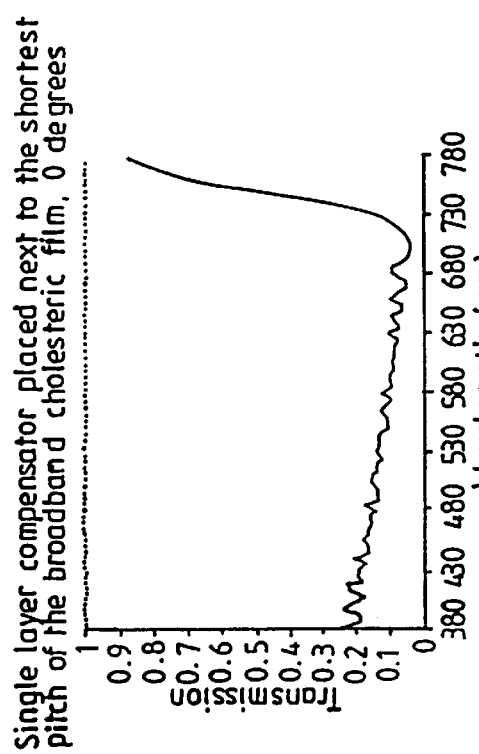
Figure 18C:
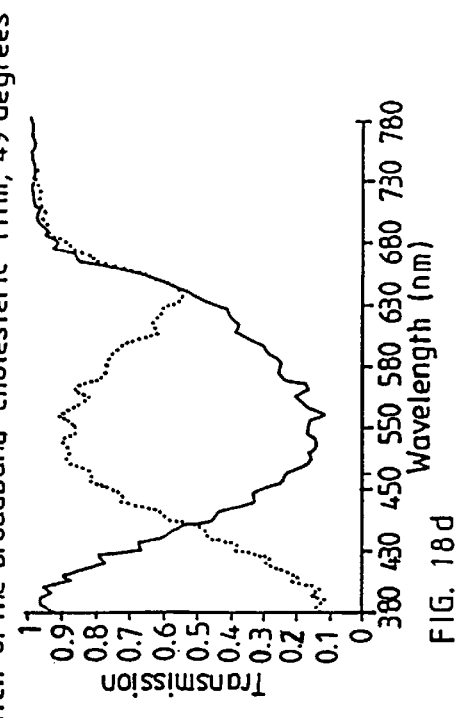
Figure 18D:
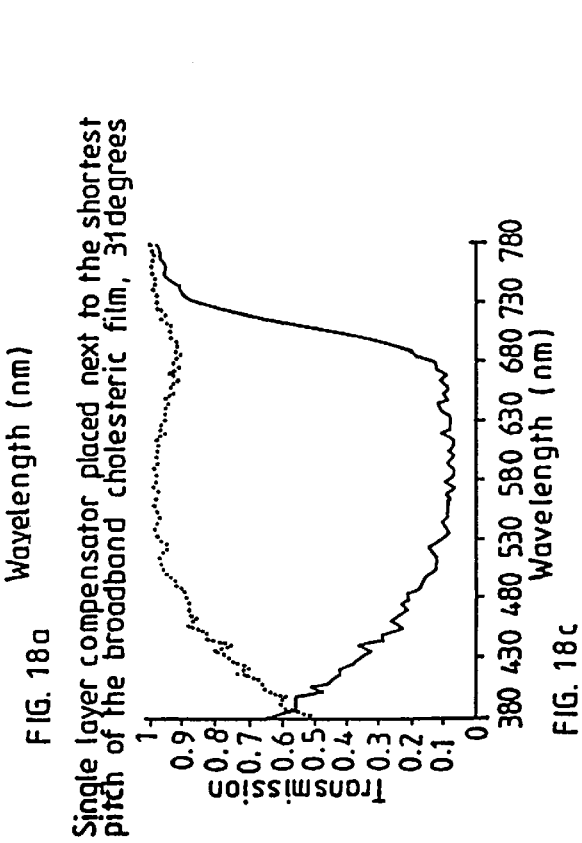

As shown in FIGS. 18a to 18c, the performance up to relatively high angles of incidence remains good and represents an improvement over known devices in which no compensator is provided. Even for an angle of incidence of 40 degrees as illustrated in FIG. 18d, polarisation separation occurs for wavelengths centred around the middle of the visible spectrum.

Figure 19:
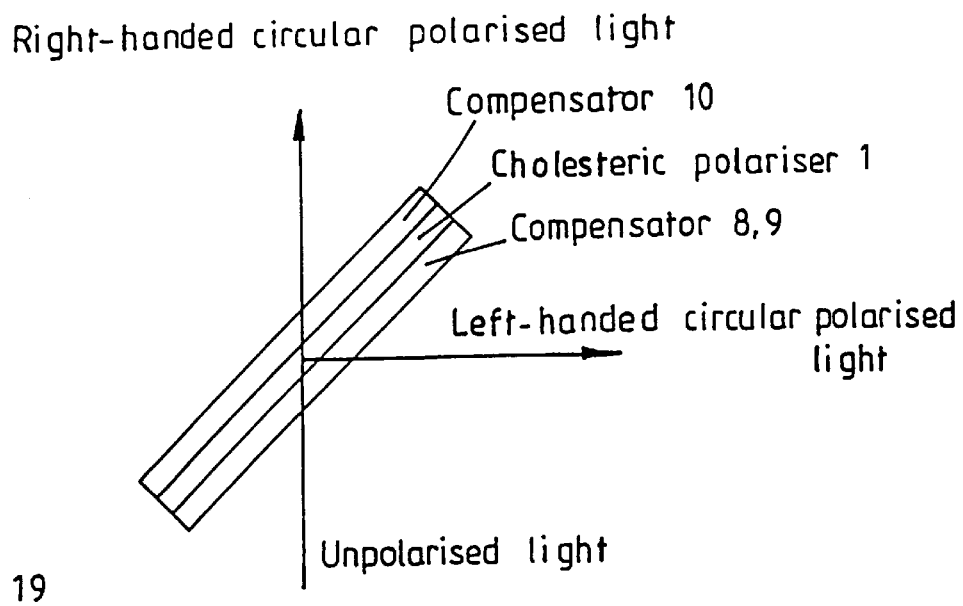
FIGS. 19 and 20 are diagrams illustrating two applications of the device shown in FIG. 15.

The optical devices disclosed herein are suitable for use in applications requiring a polarising beam-splitter for operation throughout a wide range of wavelengths and angles or to operate at high angles to an incident beam, such as of the order of 45 degrees. For instance, FIG. 19 illustrates the use of a broadband cholesteric polariser of the type shown in FIG. 15 as a polarising beam splitter. Unpolarised light is incident on the filter at an angle of approximately 45 degrees to the plane of the film. If the input compensator 8, 9 were omitted, the polariser would not properly discriminate between left and right handed circularly polarised light at this angle. However, with the input compensator 8, 9, the a)polariser discriminates well between reflecting left handed circularly polarised light and transmitting right handed circularly polarised light. In the absence of the compensator 10, the polarisation state of the transmitted light would be substantially distorted. However, the compensator 10 ensures that the transmitted light is substantially in the desired state of circular polarisation.

Figure 20:
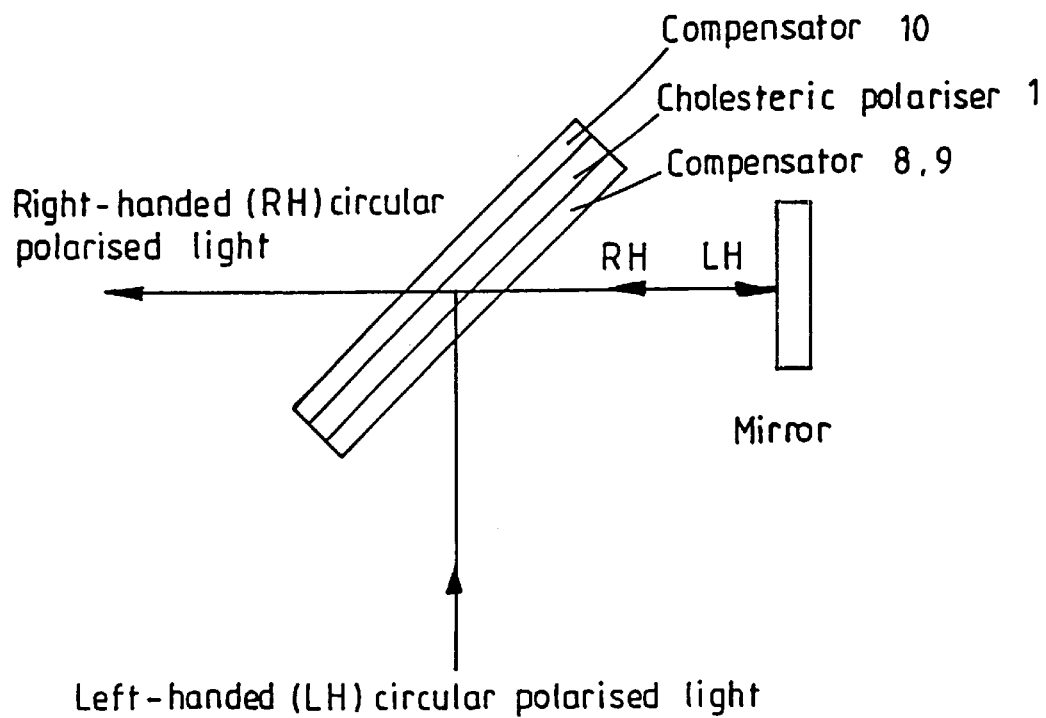

Such a polarising beam splitter may be used in other applications, such as beam combining or path folding for polarised light. FIG. 20 illustrates use of a device of the type shown in FIG. 15 for folding an optical system. Again, the input compensator 8, 9 maintains the reflectivity of the polariser across a wide range of wavelengths and angles. The compensator 10 is provided if it is necessary to maintain a high degree of circular polarisation of the transmitted light.

Figure 21:
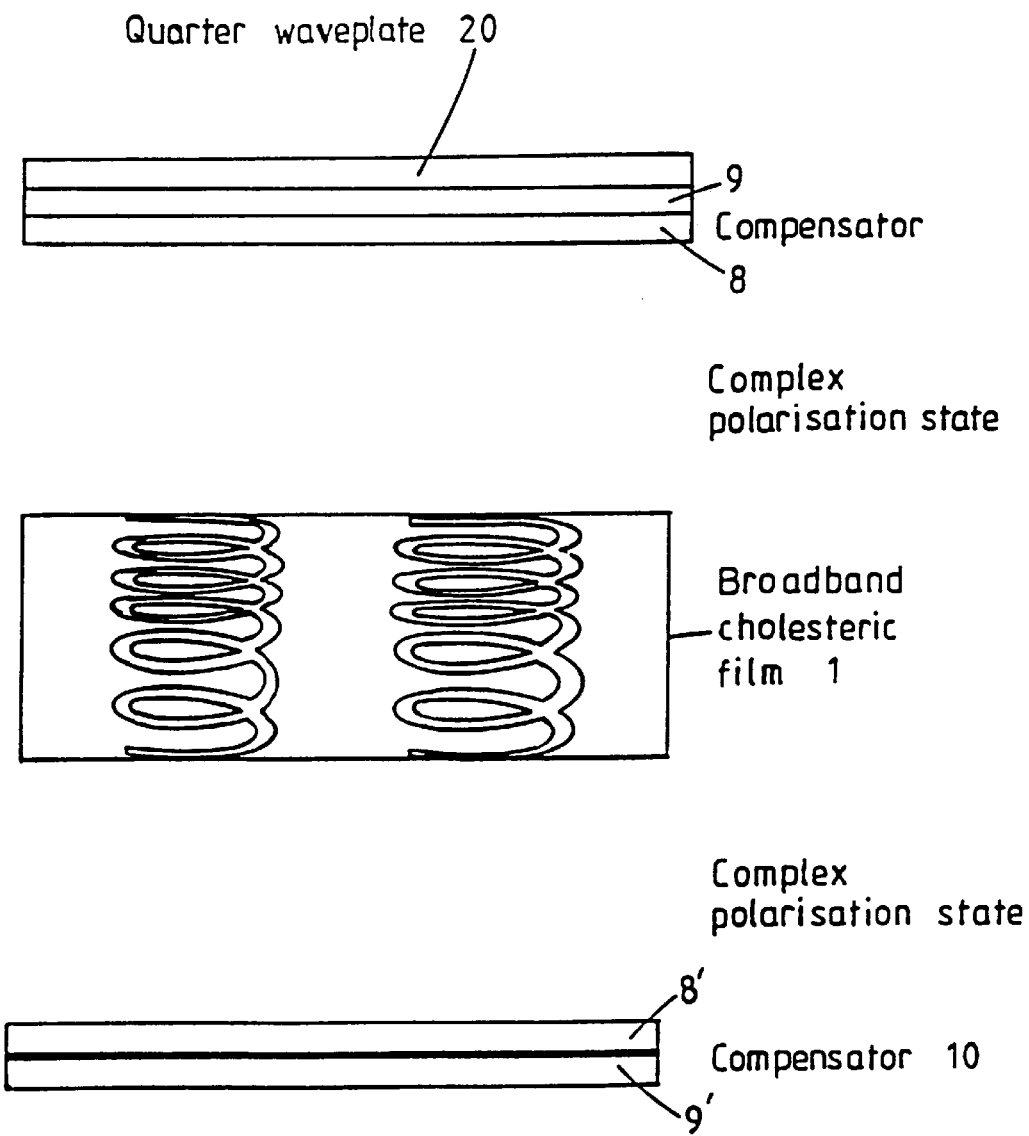
FIGS. 21 and 22 are diagrams showing optical devices constituting fifth and sixth embodiments of the invention.
Figure 22:
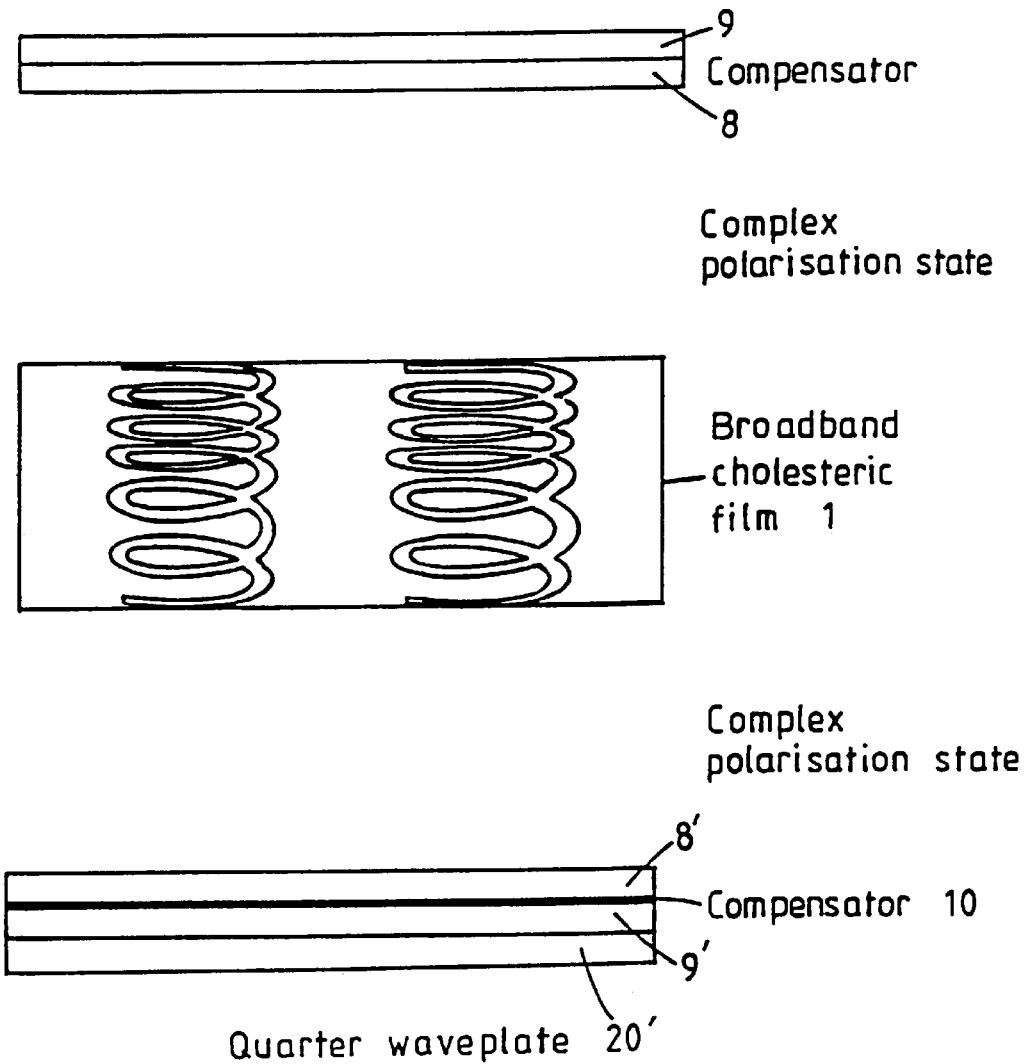

FIG. 21 illustrates a device which differs from that shown in FIG. 15 in that a quarter waveplate 20 is disposed adjacent the negative birefringence layer 9. Similarly, FIG. 22 illustrates a device which differs from that shown in FIG. 15 in that a quarter waveplate 20' is disposed adjacent the compensator 10. As is well known, such a quarter waveplate may be used for converting between linearly polarised and circularly polarised light.

Although the quarter waveplates 20 and 20' are shown adjacent the outer surfaces of the negative birefringence layers 9 and 9' respectively, in practice the quarter waveplate may be disposed at any position within the device, for instance between adjacent ones of any of the layers or films including the film 1, or even internally within a layer or film of the compensator 8, 9 or 10.

It is possible for the quarter waveplate to be made integrally with the compensator 8, 9 or with the compensator 10. In particular, the quarter waveplate and one of the layers 8, 9, 8', 9', may be combined in to a single layer. For instance, the quarter waveplate 20 or 20' and the compensator 8, 9 or 10 may be embodied as a first layer or film of a biaxial material whose largest refractive index is perpendicular to the plane and a layer or film of negative uniaxial material whose optic axis is perpendicular to the plane. Another possibility for this combination comprises a layer or film of a biaxial material whose smallest refractive index is perpendicular to the plane and a layer or film of a positive uniaxial material whose optic axis is perpendicular to the plane. Alternatively, if the quarter waveplate is discrete from the compensator 8, 9 or 10, it may be made as a separate film from different materials, such as a multilayer structure, for optimised broad bandwidth.

Figure 23:
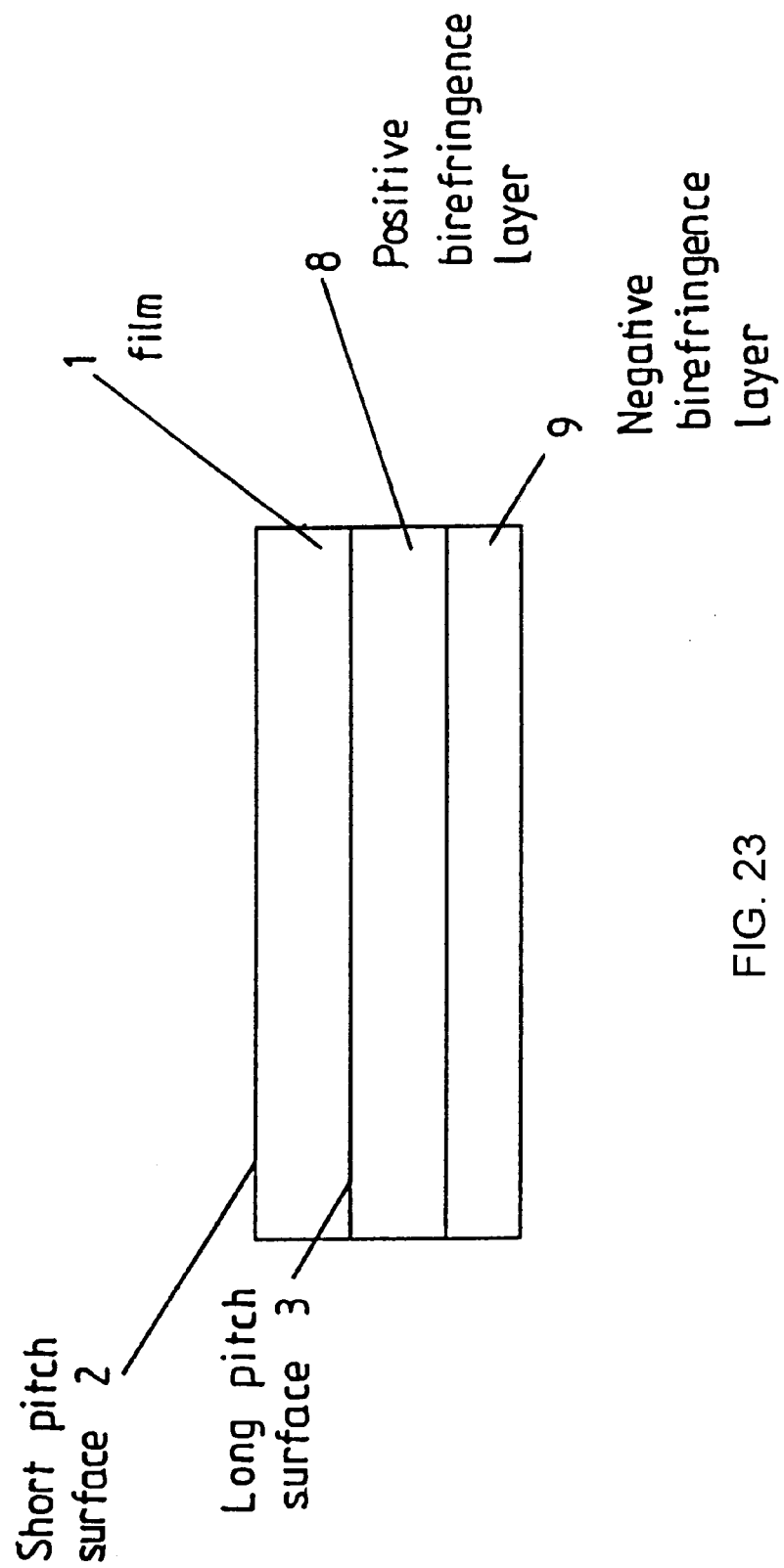
FIG. 23 is a diagram showing an optical device constituting a seventh embodiment of the invention.

The device shown in FIG. 23 differs from that shown in FIG. 10 in that the positive birefringence layer 8 is disposed between and in contact with the long pitch surface 3 of the film 1 and the negative birefringence layer 9. The dispersions of the materials of the layers 8 and 9 are as described hereinbefore for the compensator 8, 9 adjacent the long pitch surface 3.

Figure 24:
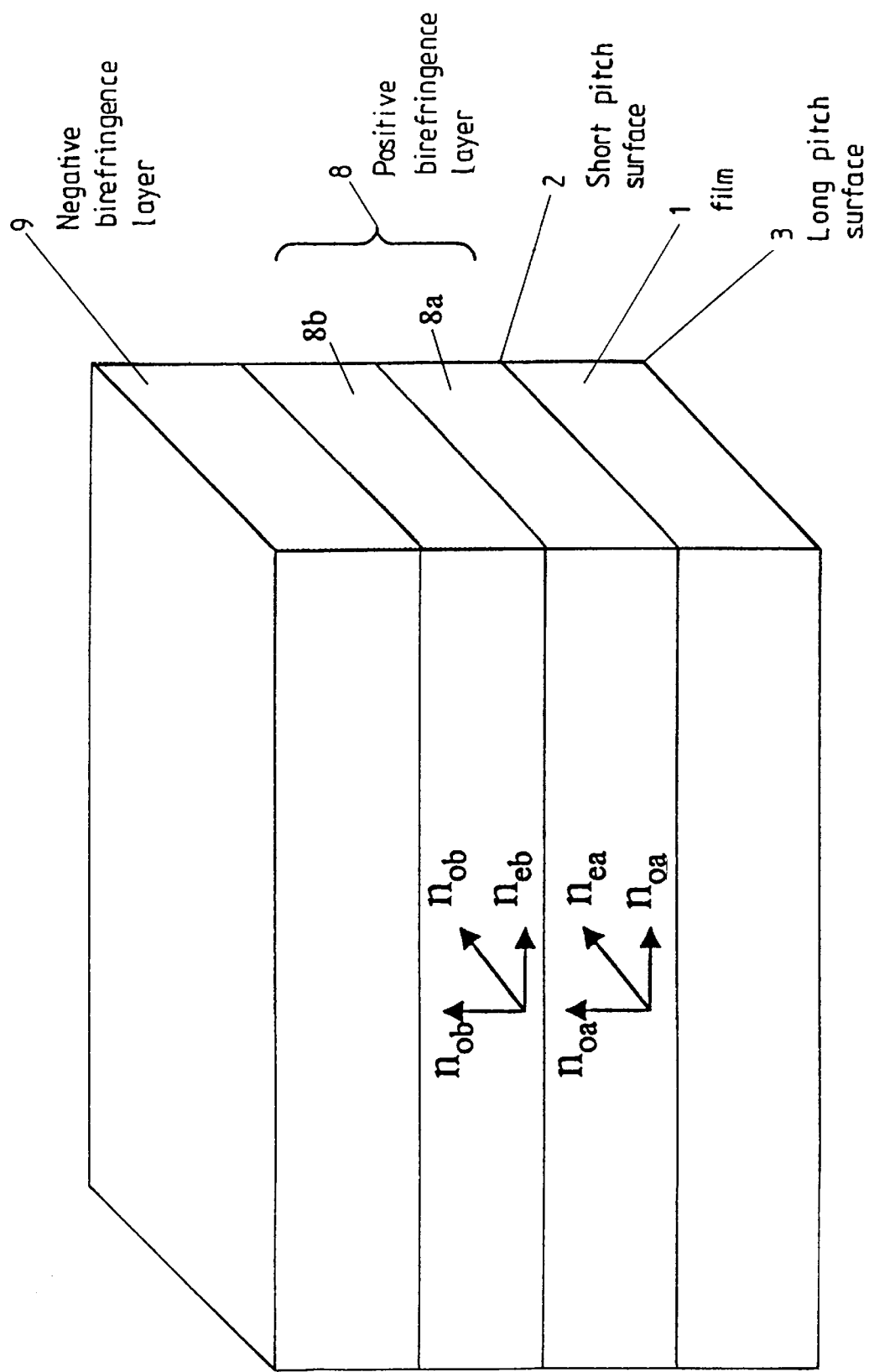
FIGS. 24 and 25 are perspective diagrams showing optical devices constituting eighth and ninth embodiments of the invention.

The device shown in FIG. 24 differs from that shown in FIG. 10 in that the positive birefringence layer 8 comprises two negative uniaxial films 8a and 8b whose optic axes $n_{ea}$ and $n_{eb}$ are substantially perpendicular to each other. In particular, the films 8a and 8b have extraordinary refractive indices $n_{ea}$ and $n_{eb}$ in the planes of the films 8a and 8b, respectively, and ordinary refractive indices $n_{oa}$ and $n_{ob}$, respectively, in the orthogonal directions shown in FIG. 24. The refractive indices are such that:

$n_{eb} < n_{ob}$ $n_{ea} < n_{oa}$

Figure 25:
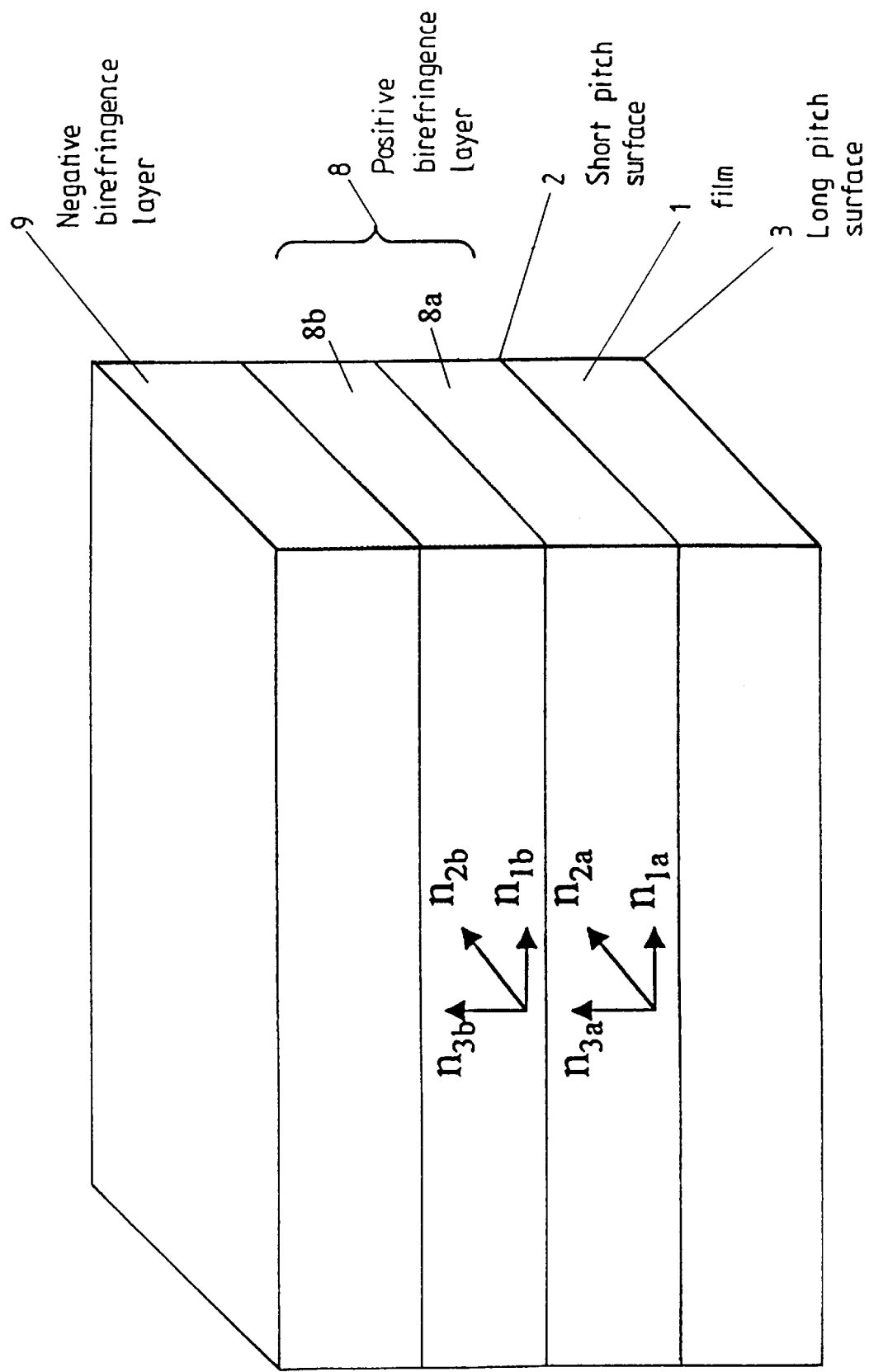

The device shown in FIG. 25 differs from that shown in FIG. 24 in that the films 8a and 8b are biaxial and the smaller in-plane refractive indices $n_{2a}$ and $n_{1b}$ are substantially perpendicular to each other. The films 8a and 8b have refractive indices labelled $n_{1a}$, $n_{2a}$, $n_{3a}$, $n_{1b}$, $n_{2b}$, and $n_{3b}$ in orthogonal directions such that:

$n_{1b} < n_{2b}$ $n_{1b} < n_{3b}$ $n_{2a} < n_{1a}$ $n_{2a} < n_{3a}$ $n_{3b} > (n_{1b} + n_{2b})/2$ $n_{3a} > (n_{1b} + n_{2b})/2$

Figure 26:
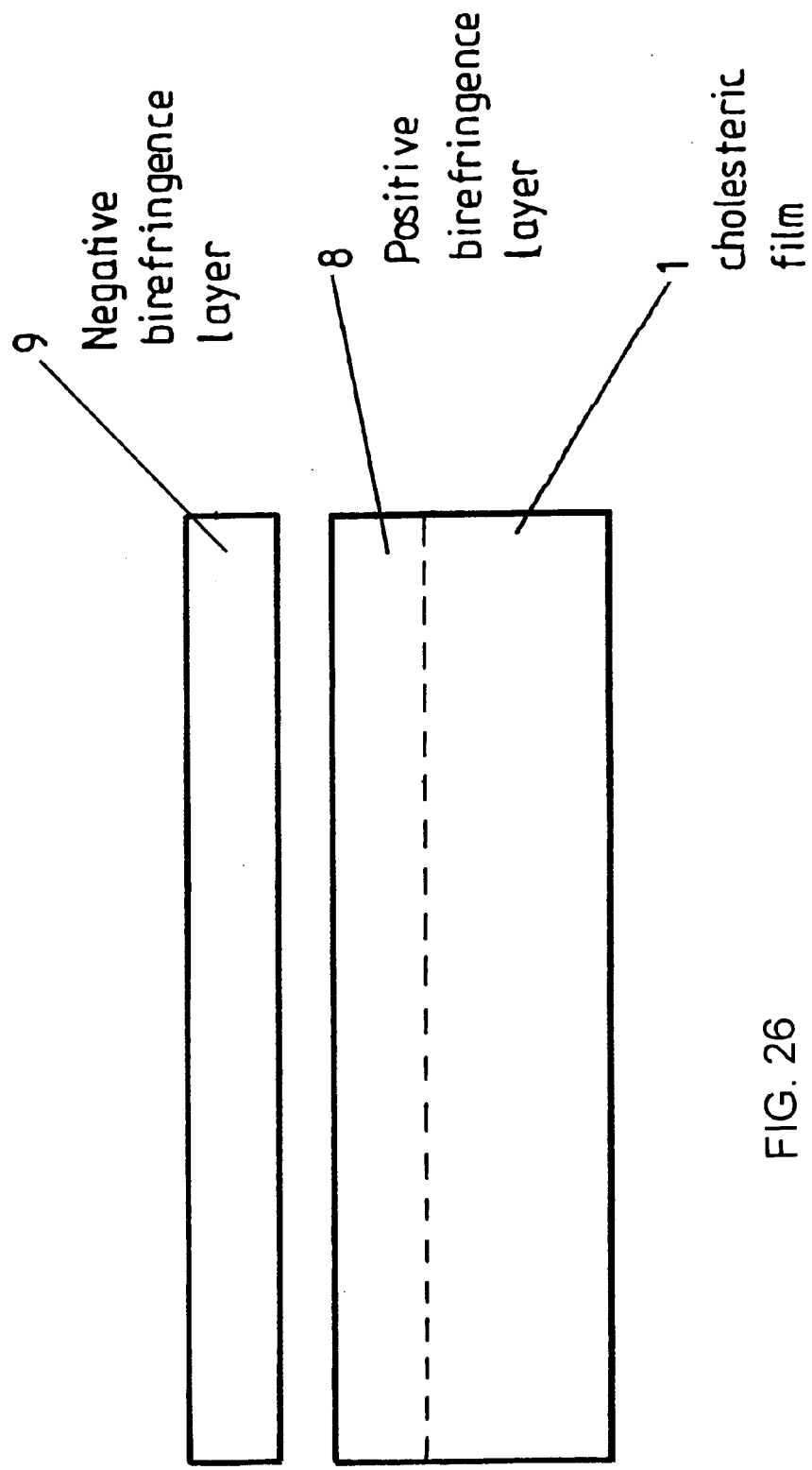
FIG. 26 is a diagram showing an optical device constituting a tenth embodiment of the invention.

The device shown in FIG. 26 differs from that shown in FIG. 10 in that the positive birefringence layer 8 comprises part of the cholesteric layer 1 having a predetermined alignment.

Figure 27:
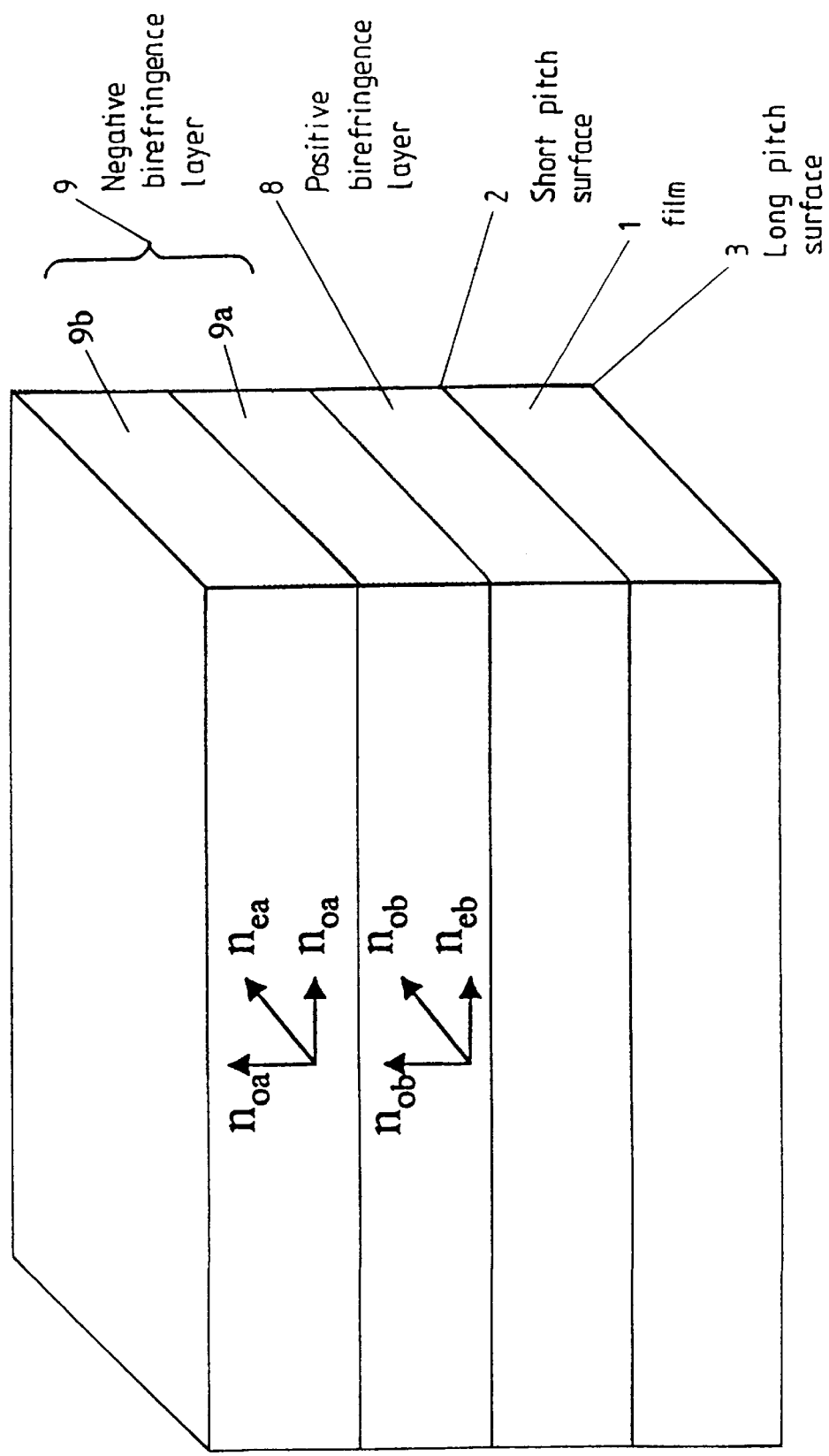
FIGS. 27 and 28 are perspective diagrams showing optical devices constituting eleventh and twelfth embodiments of the invention.

The device shown in FIG. 27 differs from that shown in FIG. 10 in that the negative birefringence layer 9 comprises two films 9a and 9b of uniaxial material having optic axes in the planes of the films which are substantially perpendicular to each other. The refractive indices $n_{oa}$, $n_{ea}$, $n_{ob}$ and $n_{eb}$ in the directions illustrated in FIG. 27 are such that:

$n_{ea} > n_{oa}$ $n_{eb} > n_{ob}$

Figure 28:
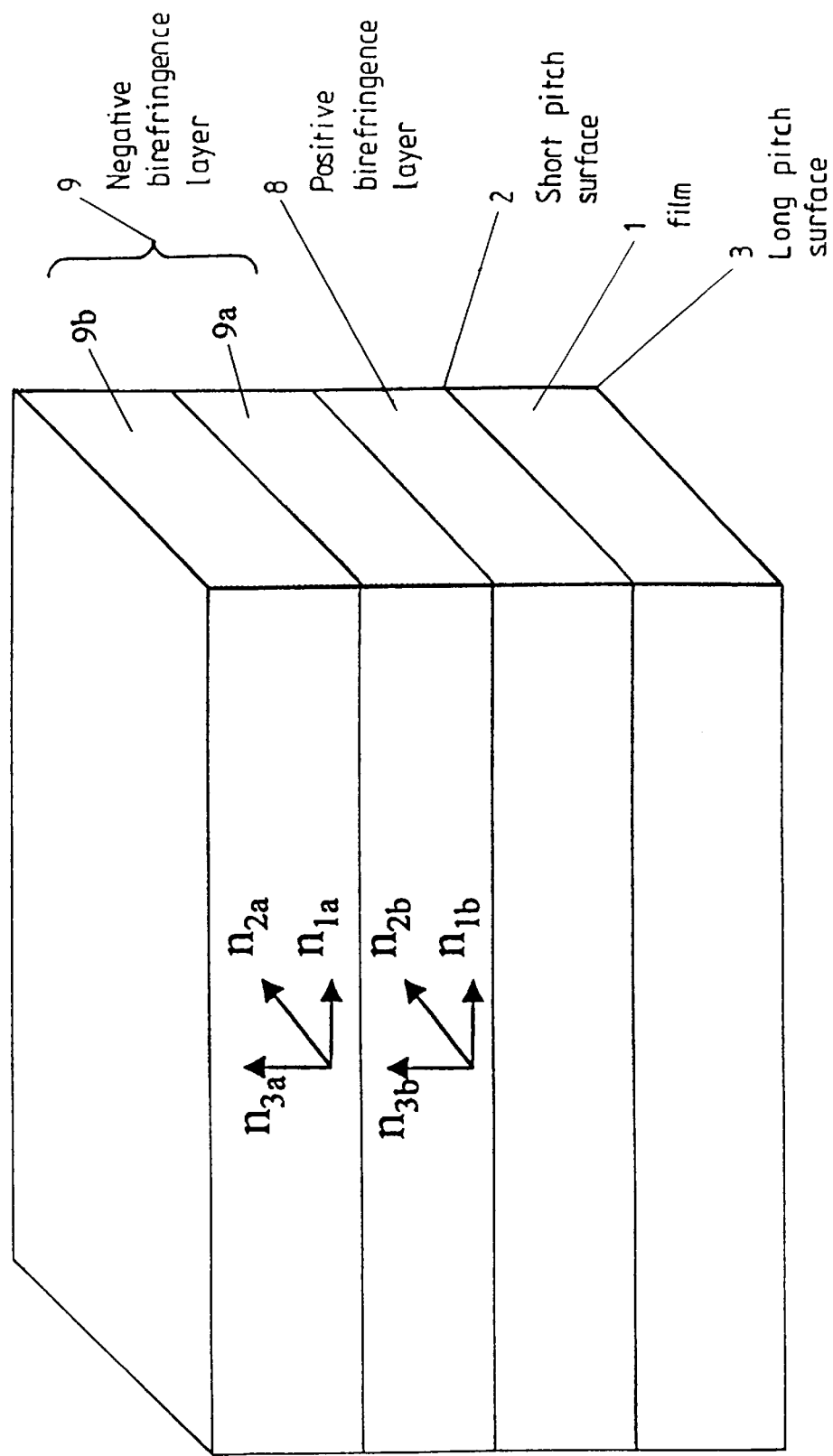

The device shown in FIG. 28 differs from that shown in FIG. 27 in that the films 9a and 9b are biaxial films whose optic axes corresponding to the greater of the in-plane refractive indices are substantially perpendicular to each other. The films 9a and 9b have refractive indices $n_{1a}$, $n_{2a}$, $n_{3a}$, $n_{1b}$, $n_{2b}$ and $n_{3b}$ in the directions shown such that:

$n_{3b} < n_{1b}$ $n_{3b} < n_{2b}$ $n_{3a} < n_{1a}$ $n_{3a} < n_{2a}$ $n_{3a} < (n_{1a} + n_{2a})/2$ $n_{3b} < (n_{1b} + n_{2b})/2$

Figure 29:
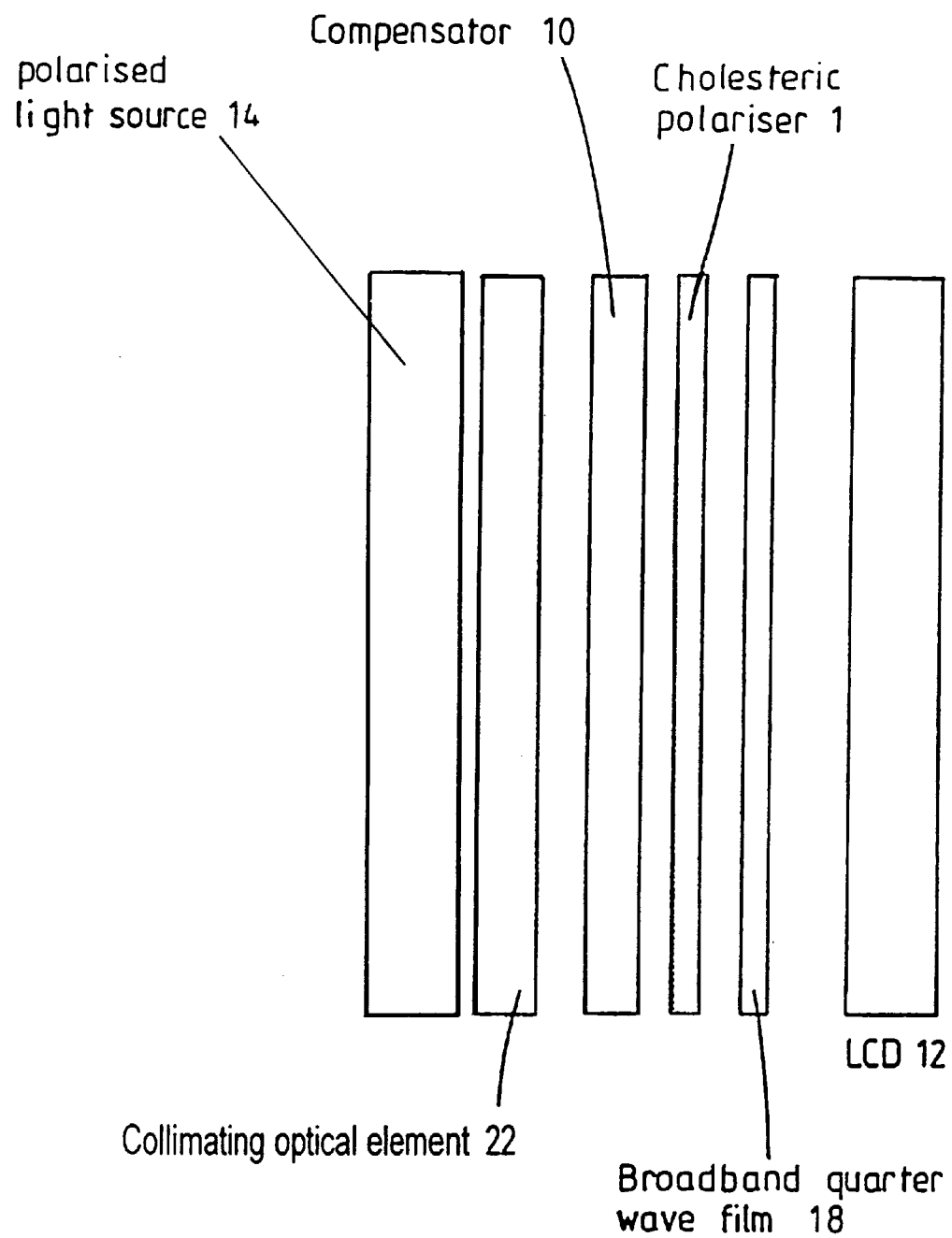
FIGS. 29 and 30 illustrate diagrammatically backlight arrangements for LCDs constituting fourteenth and fifteenth embodiments of the invention.

FIG. 29 illustrates an LCD and backlight arrangement which differs from that shown in FIG. 16 in that the unpolarised light source arrangement 14, 15, 16 is replaced by a polarised light source 14 and a collimating optical element 22. Also, the diffuser 17 is omitted, the compensator 10 is disposed between the collimating optical element 22 and the cholesteric polariser 1, and the broadband quarter wave film 18 is disposed between the polariser 1 and the LCD 12. The compensator 10, the cholesteric polariser 1 and the broadband quarter wave film 18 effectively comprise part of the liquid crystal device and act as an input polariser for the LCD 12.

Figure 30:
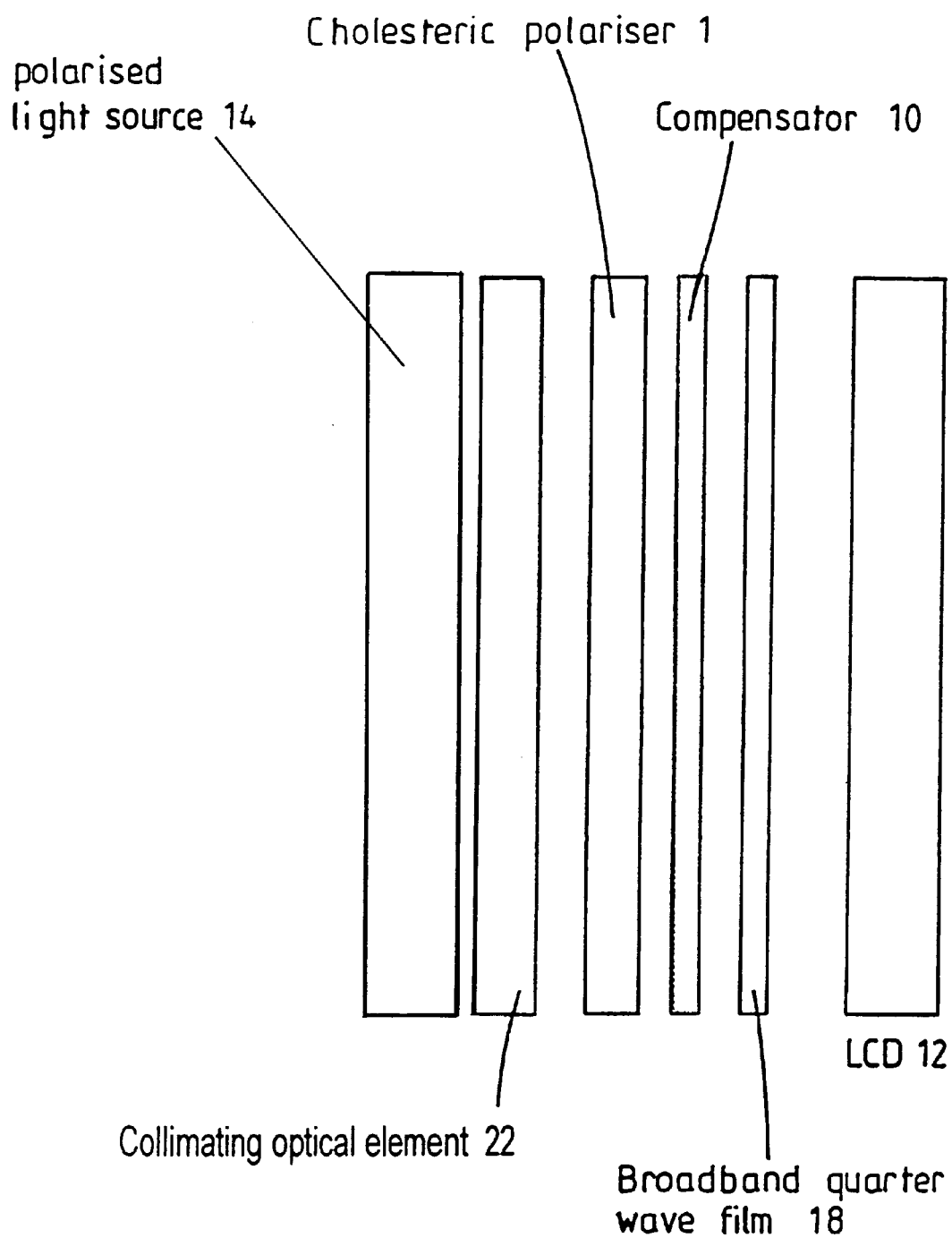

The arrangement shown in FIG. 30 differs from that shown in FIG. 29 in that the cholesteric polariser 1 is disposed between the collimating optical element 22 and the compensator 10. Thus, whereas the arrangement shown in FIG. 29 has pre-compensation for light entering the polariser 1, the arrangement shown in FIG. 30 has post-compensation for light leaving the polariser 1.

What is claimed is:

1. A broadband cholesteric optical device, comprising:

a broadband cholesteric layer; and a first compensator for providing a desired off-axis device performance, wherein the first compensator comprises a first layer having positive birefringence and an optic axis substantially perpendicular to the first layer, and a second layer having negative birefringence and an optic axis substantially perpendicular to the second layer.

2. A broadband cholesteric optical device according to claim 1, wherein the desired off-axis device performance is a reduced angular dependence.

3. A broadband cholesteric optical device according to claim 1, wherein the cholesteric layer has a graded pitch which increases monotonically from a first surface to a second surface thereof.

4. A broadband cholesteric optical device according to claim 3, wherein a sum of the off-axis birefringence of the first and second layers is substantially equal to zero for a wavelength corresponding to the shortest pitch of the cholesteric layer and substantially equal to but opposite that of the cholesteric layer for a wavelength corresponding to the longest pitch of the cholesteric layer, and the first compensator is disposed adjacent the first surface of the cholesteric layer.

5. A broadband cholesteric optical device according to claim 4, wherein the refractive index dispersions of the first and second layers is expressed as $$|\Delta n_1(400)/\Delta n_1(700)| - |\Delta n_2(400)/\Delta n_2(700)| > 0$$

where $\Delta n_1(400)$ and $\Delta n_1(700)$ are the birefringences of the first layer at wavelengths of 400 nm and 700 nm, respectively, and $\Delta n_2(400)$ and $\Delta n_2(700)$ are the birefringences of the second layer at wavelengths of 400 nm and 700 nm, respectively.

6. A broadband cholesteric optical device according to claim 3, wherein a sum of the off-axis birefringence of the first and second layers is substantially equal to zero for a wavelength corresponding to the longest pitch of the cholesteric layer and substantially equal to but opposite that of the cholesteric layer for a wavelength corresponding to the shortest pitch of the cholesteric layer, and the first compensator is disposed adjacent the second surface of the cholesteric layer.

7. A broadband cholesteric optical device according to claim 6, wherein the refractive index dispersions of the first and second layers is expressed as $$|\Delta n_2(400)/\Delta n_2(700)| - |\Delta n_1(400)/\Delta n_1(700)| > 0$$

where $\Delta n_1(400)$ and $\Delta n_1(700)$ are the birefringences of the first layer at wavelengths of 400 nm and 700 nm, respectively, and $\Delta n_2(400)$ and $\Delta n_2(700)$ are the birefringences of the second layer at wavelengths of 400 nm and 700 nm, respectively.

8. A broadband cholesteric optical device according to claim 1, wherein the cholesteric layer has a graded refractive index which increases monotonically from a first surface to a second surface thereof.

9. A broadband cholesteric optical device according to claim 1, wherein the first layer comprises a reactive mesogenic material.

10. A broadband cholesteric optical device according to claim 9, wherein the first layer comprises a homeotropically aligned reactive mesogenic material.

11. A broadband cholesteric optical device according to claim 1, wherein the first layer is formed at least in part by the cholesteric layer having a predetermined alignment.

12. A broadband cholesteric optical device according to claim 1, wherein the first layer comprises at least one stretched polymer film.

13. A broadband cholesteric optical device according to claim 1, wherein the first layer comprises a plurality of uniaxial films, each of which has negative birefringence and an optic axis substantially in the plane thereof, the optic axes of each adjacent pair of the uniaxial films being angularly spaced by a non-zero angle.

14. A broadband cholesteric optical device according to claim 13, wherein the first layer comprises two uniaxial films whose optic axes are substantially perpendicular to each other.

15. A broadband cholesteric optical device according to claim 1, wherein the first layer comprises a plurality of biaxial films, each of which has a refractive index in a direction perpendicular to the film which is greater than the average of the refractive indices in the plane of the film, the optic axes corresponding to the smaller of the in-plane refractive indices of each adjacent pair of films being angularly spaced by a non-zero angle.

16. A broadband cholesteric optical device according to claim 15, wherein the first layer comprises two biaxial films whose optic axes corresponding to the smaller of the in-plane refractive indices are substantially perpendicular to each other.

17. A broadband cholesteric optical device according to claim 1, wherein the second layer comprises a cholesteric layer having a pitch corresponding to a wavelength of less than substantially 440 nm.

18. A broadband cholesteric optical device according to claim 17, wherein the second layer is formed at least in part by the cholesteric layer.

19. A broadband cholesteric optical device according to claim 1, wherein the second layer comprises a cast polymer film.

20. A broadband cholesteric optical device according to claim 19, wherein the polymer is polyimide.

21. A broadband cholesteric optical device according to claim 1, wherein the second layer comprises a discotic crystal material.

22. A broadband cholesteric optical device according to claim 1, wherein the second layer comprises at least one stretched polymer film.

23. A broadband cholesteric optical device according to claim 1, wherein the second layer comprises a plurality of films, each of which has a uniaxial material having an optic axis substantially in the plane thereof, the optic axes of each adjacent pair of the films being angularly spaced by a non-zero angle.

24. A broadband cholesteric optical device according to claim 23, wherein the second layer comprises two films whose optic axes are substantially perpendicular to each other.

25. A broadband cholesteric optical device according to claim 1, wherein the second layer comprises a plurality of biaxial films, each of which has a refractive index in a direction perpendicular to the film which is smaller than the average of the refractive indices in the plane of the film, the optic axes corresponding to the greater of the in-plane refractive indices of each adjacent pair of the films being angularly spaced by a non-zero angle.

26. A broadband cholesteric optical device according to claim 25, wherein the second layer comprises two biaxial films whose optic axes corresponding to the greater of the in-plane refractive indices are substantially perpendicular to each other.

27. A broadband cholesteric optical device according to claim 1, wherein the first compensator includes an on-axis retarder.

28. A broadband cholesteric optical device according to claim 27, wherein the retarder is a quarter waveplate.

29. A broadband cholesteric optical device according to claim 1, wherein the cholesteric layer is disposed between the first compensator and a second compensator, the second compensator comprising a plurality of layers which include a positive birefringence layer, having positive birefringence and an optic axis substantially perpendicular to the positive birefringence layer, and an negative birefringence layer, having birefringence and an optic axis substantially perpendicular to the negative birefringence layer.

30. A broadband cholesteric optical device according to claim 29, wherein the second compensator includes an on-axis retarder.

31. A broadband cholesteric optical device according to claim 30, wherein the retarder is a quarter waveplate.

32. A polarizer comprising a broadband cholesteric optical device, wherein the broadband cholesteric optical device is the one according to claim 1.

33. A filter comprising a broadband cholesteric optical device, wherein the broadband cholesteric optical device is the one according to claim 1.

34. A liquid crystal device comprising a broadband cholesteric optical device, wherein the broadband cholesteric optical device is the one according to claim 1.

35. A polarizing beam-splitter comprising a broadband cholesteric optical device, wherein the broadband cholesteric optical device is the one according to claim 1.

* * * * *